US009782877B2

(12) United States Patent
Marquis

(10) Patent No.: US 9,782,877 B2
(45) Date of Patent: Oct. 10, 2017

(54) PANEL FASTENER TOOL FOR QUICKLY, SAFELY, AND EASILY REMOVING AND INSERTING PANEL FASTENERS

(71) Applicant: Robert Paul Marquis, Exeter, NH (US)

(72) Inventor: Robert Paul Marquis, Exeter, NH (US)

( * ) Notice: Subject to any disclaimer, the term of this patent is extended or adjusted under 35 U.S.C. 154(b) by 44 days.

(21) Appl. No.: 14/644,271

(22) Filed: Mar. 11, 2015

(65) Prior Publication Data
US 2016/0263733 A1    Sep. 15, 2016

(51) Int. Cl.
*B25B 27/02* (2006.01)
*B25B 31/00* (2006.01)
*F16B 19/10* (2006.01)

(52) U.S. Cl.
CPC .............. *B25B 27/02* (2013.01); *B25B 31/00* (2013.01); *F16B 19/1081* (2013.01)

(58) Field of Classification Search
CPC ........... B25B 27/14; B25B 31/00; B25B 7/00; B25B 7/02; B25B 9/00; B25C 11/00; B25C 11/02; B25C 5/025; B21J 15/50; Y10T 29/5377; Y10T 29/53657
USPC ............ 254/18, 23, 24, 28, 22; 29/268, 278, 29/235, 232, 243.56; 81/300, 418; 96/18, 23, 24, 28
See application file for complete search history.

(56) References Cited

U.S. PATENT DOCUMENTS 342,480 A * 5/1886 Thayer .................... B25C 11/02
254/28
358,016 A * 2/1887 Clark .................. B25B 23/0085
29/232
532,265 A    1/1895 Cornell
(Continued)

FOREIGN PATENT DOCUMENTS

| CA | 2444426 | 4/2005 |
| CN | 102218722 | 10/2011 |
| WO | 2009024832 | 2/2009 |

OTHER PUBLICATIONS

Softnews Net, autoevolution, How to Remove Panel Clips, Retainers and Trim Rivets, http://www.autoevolution.com/news/how-to-remove-panel-clips-retainers-andtrim-rivets-60970.html, May 1, 2015.

(Continued)

*Primary Examiner* — Joseph J Hail
*Assistant Examiner* — Arman Milanian
(74) *Attorney, Agent, or Firm* — Russ Weinzimmer & Associates, PC

(57) ABSTRACT

A panel fastener tool is disclosed that includes a first arm pivotally connected to a second arm. Each of the first arm and second arm include a camming portion, a camming surface, a terminal projection projecting substantially inwardly, and an indent between the camming portion and the terminal projection. Upon pivoting the first arm and the second arm towards each other, the camming surfaces each engage a top portion of an inner member of a fastener inserted into a hole in a workpiece. The camming surfaces (Continued)

lift the inner member out of an insertable member of the fastener, and the terminal projections capture a head portion of the insertable member within the indents. When an upward force is applied, the terminal projections lift the insertable member from the hole.

10 Claims, 20 Drawing Sheets

(56) References Cited

U.S. PATENT DOCUMENTS

| | | | |
|---|---|---|---|
| 627,669 A * | 6/1899 | Jenkins | G04D 1/08 269/221 |
| 1,079,997 A * | 12/1913 | Wernimont | A47J 43/283 294/3 |
| 1,498,488 A * | 6/1924 | Stallings | B25B 7/02 81/309 |
| 1,771,712 A * | 7/1930 | Jimerson | E01B 29/26 254/18 |
| 1,802,666 A * | 4/1931 | Mueller | B25F 1/003 7/125 |
| 1,886,732 A * | 11/1932 | Poland | B25B 7/02 72/409.01 |
| 1,962,814 A * | 6/1934 | Gilstrap | B25B 27/005 29/246 |
| 2,033,050 A * | 3/1936 | Pankonin | B25C 11/02 227/63 |
| 2,037,834 A * | 4/1936 | Sutherland | B25B 27/005 29/246 |
| 2,070,217 A * | 2/1937 | Seger | B25F 1/006 254/22 |
| 2,271,945 A * | 2/1942 | Meinhardt | G04D 1/08 29/232 |
| 2,372,222 A * | 3/1945 | Mullgardt | B21J 15/043 411/43 |
| D151,857 S * | 11/1948 | Pankonin | 254/28 |
| 2,464,105 A * | 3/1949 | Thomas | G04D 1/08 29/232 |
| 2,470,327 A * | 5/1949 | Tener | B25B 27/02 251/337 |
| D157,996 S * | 4/1950 | Pankonin | 254/28 |
| D160,420 S * | 10/1950 | Pankonin | 254/28 |
| 2,549,260 A * | 4/1951 | Sudbury | B25C 11/02 172/23 |
| 2,553,660 A * | 5/1951 | Levendusky | B25C 11/02 227/63 |
| 2,582,640 A * | 1/1952 | Maddox | A61D 1/06 29/235 |
| 2,662,727 A * | 12/1953 | Yerkes | B25C 11/02 254/28 |
| 2,741,841 A | 4/1956 | Egeth | |
| 2,776,109 A * | 1/1957 | Segal | B25C 11/02 254/28 |
| 3,952,618 A | 4/1976 | Seamon | |
| 4,079,765 A | 3/1978 | Hatayan | |
| 4,653,309 A * | 3/1987 | Hendricks | B21J 15/043 29/243.53 |
| 4,658,489 A * | 4/1987 | Johnston | B25B 27/00 29/268 |
| 4,756,078 A * | 7/1988 | Dougherty | H05K 13/0491 29/268 |
| 4,830,556 A | 5/1989 | Nelson | |
| 4,872,251 A * | 10/1989 | Sheppard | B25B 7/02 29/243.56 |
| 4,941,252 A * | 7/1990 | Haisch | B25B 27/023 29/261 |
| 5,005,449 A | 4/1991 | Sorensen et al. | |
| 5,085,404 A * | 2/1992 | Thieleke | B25C 11/02 254/28 |
| 5,295,290 A | 3/1994 | Johnston | |
| 5,407,160 A | 4/1995 | Hollingsworth et al. | |
| 5,611,519 A * | 3/1997 | Garcia | B25B 7/02 254/22 |
| 5,722,284 A * | 3/1998 | Linsmeyer | B25B 7/02 29/751 |
| 5,735,031 A | 4/1998 | Johnson | |
| 5,803,435 A * | 9/1998 | Hsu | B25C 11/02 254/28 |
| 5,890,273 A | 4/1999 | Haytayan | |
| 6,240,614 B1 * | 6/2001 | Kojima | B21J 15/50 29/268 |
| 6,256,855 B1 | 7/2001 | Schall | |
| 6,412,375 B1 * | 7/2002 | Wang | B25B 7/02 254/18 |
| 6,473,955 B1 * | 11/2002 | Huang | B21J 15/386 269/6 |
| 6,473,956 B1 | 11/2002 | Tucker | |
| 6,481,691 B1 * | 11/2002 | Irving | B25C 11/02 227/63 |
| 7,594,455 B2 | 9/2009 | Swanson et al. | |
| 7,906,715 B2 | 3/2011 | Coco et al. | |
| 8,484,818 B2 | 7/2013 | Ritorto, Jr. et al. | |
| 8,534,651 B2 | 9/2013 | Scapa et al. | |
| 8,595,911 B2 | 12/2013 | Hendren et al. | |
| 2006/0150786 A1 | 7/2006 | Whitehead et al. | |
| 2009/0165607 A1 | 7/2009 | Martin | |
| 2010/0005640 A1 * | 1/2010 | Fuller | B25B 7/00 29/268 |
| 2011/0278513 A1 * | 11/2011 | Esposito | B25F 3/00 254/18 |
| 2013/0253540 A1 | 9/2013 | Castro et al. | |

OTHER PUBLICATIONS

Amazon.com, Performance Tool W86561 Push Pin Pliers, http://www.amazon.com/Performance-Tool-W86561-Push-Pliers/dp/B003WZTI12/ref=pd_sim_auto_5?ie=UTF8&refRID=1C8B5Q1G9S464RA1PX3F, May 1, 2015.
Banggod Ltd., Plastic Snap Fastener Installation Tools Hand Pressure Pliers, http://www.banggood.com/Plastic-Snap-Fastener-Installation-Tools-Hand-Pressure-Pliers-p-79768.html?currency=USD&utm_source=google&utm_medium=shopping&utm_content=miko_ruby&utm_campaign=All-us&gclid=CLSn6ba-h74CFcvm7AodWwIAIA, May 1, 2015.
Harbor Freight Tools, Push Pin Pliers, http://www.harborfreight.com/push-pin-pliers-67400.html, May 1, 2015.

* cited by examiner

PANEL FASTENER TOOL FOR QUICKLY, SAFELY, AND EASILY REMOVING AND INSERTING PANEL FASTENERS

FIELD OF THE INVENTION

This invention generally relates to panel fasteners, and more particularly to tools and methods for removing and inserting panel fasteners.

BACKGROUND

Press-in style panel fasteners are used in a wide array of applications ranging from automotive trim attachment to shelving, furniture assembly, etc. One particularly prevalent fastener style has a two-part construction, whereby a substantially cylindrical insertable member having a flared head portion is adapted to be secured to a workpiece. The insertable member has a hollow portion that typically runs longitudinally therethrough. This fastener also includes an inner member that fits into the hollow portion of the insertable member. The insertable member is deformable, such that its projections are flared out once the fastener is inserted into a hole in a panel, effectively locking the panel fastener in place. An example of such a prior art panel fastener is illustrated in FIG. 1.

Various tools and techniques are sometimes used to remove of such panel fasteners. For example, a flat blade can be wedged under the fastener head, and the fastener can then be pried out of the panel into which it is inserted. This necessitates that the tool be pivoted to lift the fastener away from the panel. Unfortunately, this requires a fairly long travel of a handle to which the blade is attached, such that use in confined spaces is limited or even impossible.

Also, such tools and techniques often scratch or otherwise damage the surface of the panel, since the blade must be pivoted so as to pry out the fastener. Similar issues arise with flat-head screwdrivers, or generic pry tools, which are generally poorly suited for removing these fasteners. Besides damage to surrounding panels, these tools can also damage the panel fasteners themselves, effectively rendering them useless.

When a panel fastener has been repeatedly used, the projections can become permanently flared out. This often renders the fastener useless, requiring new fasteners to be purchased. Additionally insertion of panel fasteners is typically done by hand, and is often a laborious, tedious, and difficult task.

SUMMARY

The panel fastener tool of the invention quickly and easily facilitates both removal and insertion of two-piece panel fasteners. Further, the fastener tool can remove two-piece panel fasteners safely, i.e., without damaging the adjacent panel surface or the two-piece panel fastener itself, meaning that the fastener can be reused. Thus, the panel fastener tool provides quantifiable savings of time, materials, and money. Additionally, the panel fastener tool can insert and remove fasteners in areas with minimal clearance so that the fasteners can be inserted and removed from relatively tight spaces. Further, the panel fastener tool can adapt to fasteners of different heights and widths. Thus, the panel fastener tool serves as an "all-in-one" solution for the removal and insertion of a wide variety of panel fasteners used in various applications, benefiting users from hobbyists, to "do-it-yourselfers," to large manufacturing and service companies.

According to one general aspect, a panel fastener tool includes a first arm pivotally connected to a second arm. Each of the first arm and second arm include a camming portion, a camming surface provided on the camming portion, a terminal projection projecting substantially perpendicular and inwardly from the camming portion, and an indent between the camming portion and the terminal projection. Upon pivoting the first arm and the second arm towards each other, the camming surface of the first arm and the camming surface of the second arm each engage a top portion of an inner member of a fastener inserted into a hole in a workpiece. The camming surface of the first arm and the camming surface of the second arm lift the inner member out of an insertable member of the fastener, and the terminal projection of the first arm and the terminal projection of the second arm capture a head portion of the insertable member within the indent of the first arm and the indent of the second arm. When an upward force is applied, the terminal projection of the first arm and the terminal projection of the second arm lift the insertable member from the hole.

In preferred embodiments, the panel fastener tool further includes a biasing member connected to the first arm and the second arm, the biasing member biasing the first arm and second arm away from each other.

In another preferred embodiment, each of the first arm and the second arm include a receiving portion. The tool includes a pin provided through the receiving portion of the first arm and the receiving portion of the second arm, pivotally connecting the first arm and the second arm.

In another preferred embodiment, the terminal projection projects a distance that is less than a distance that the camming portion projects.

In another preferred embodiment, the camming surface of the first arm or the camming surface of the second arm include a concave ramp.

In another preferred embodiment, the first arm includes a first top portion and second top portion separated by a first distance. The second arm includes a third top portion and a fourth top portion separated by a second distance. The first distance being greater than the second distance. The third top portion and the fourth top portion are provided in between the first top portion and the second top portion.

In another preferred embodiment, at least one of the first arm or the second arm includes a receiving section. The camming portion is disposed within the receiving section and is configured to slide longitudinally within the receiving section. The at least of the first arm or the second arm further comprises a biasing member disposed within the receiving section in between a top portion of the camming portion and a top portion of the receiving section. The at least one of the first arm or the second arm further includes a hinge connecting the camming portion to the at least of the first arm or the second arm. The camming portion has a range of motion inwardly and away from the at least first arm or the second arm.

In another preferred embodiment, the panel fastener tool includes a push pin connected to the first arm and the second arm, via a pin provided through receiving portions of the first arm, the second arm, and the push pin. The push pin is configured to slide vertically, engage the inner member of the fastener, and press the inner member into the insertable member of the fastener.

According to another general aspect, a panel fastener tool includes a first arm pivotally connected to a second arm. Each of the first arm and second arm include a camming portion, a camming surface provided on the camming portion, a terminal projection projecting substantially perpendicular and inwardly from the camming portion, an indent between the camming portion and the terminal projection, and a push pin connected to the first arm and the second arm, via a pin provided through receiving portions of the first arm, the second arm, and the push pin, the push pin configured to slide vertically. Upon pivoting the first arm and the second arm towards each other, the camming portion of the first arm and the camming portion of the second arm each engage projections of an insertable member of a fastener and maintain the projections in an inward position. The camming surface of the first arm and the camming surface of the second arm capture a head portion of the insertable member. When downward force applied to the pushpin causes the pushpin to press the inner member into the insertable member, press the insertable member in to a hole in a workpiece, and press the projections of the insertable member into an outward position.

In another preferred embodiment, the terminal projection projects a distance that is less than a distance that the camming portion projects.

In another preferred embodiment, the camming surface of the first arm or the camming surface of the second arm include a concave ramp.

In another preferred embodiment, the first arm includes a first top portion and second top portion separated by a first distance. The second arm includes a third top portion and a fourth top portion separated by a second distance. The first distance being greater than the second distance. The third top portion and the fourth top portion are provided in between the first top portion and the second top portion.

In another preferred embodiment, at least one of the first arm or the second arm includes a receiving section. The camming portion is disposed within the receiving section and is configured to slide longitudinally within the receiving section. The at least of the first arm or the second arm further comprises a biasing member disposed within the receiving section in between a top portion of the camming portion and a top portion of the receiving section. The at least one of the first arm or the second arm further includes a hinge connecting the camming portion to the at least of the first arm or the second arm. The camming portion has a range of motion inwardly and away from the at least first arm or the second arm.

According to another general aspect, a panel fastener includes a first arm pivotally connected to a second arm. Each of the first arm and second arm include a receiving section, a camming portion provided within the receiving section and configured to slide vertically within the receiving section, a camming surface provided on the camming portion, a terminal projection outside of the receiving section, the terminal projection projecting substantially perpendicular or inwardly from the camming portion, and an indent between the camming portion and the terminal projection. Upon pivoting the first arm and the second arm towards each other, the camming portion of the first arm and the camming portion of the second arm each engage a top portion of an inner member of a fastener inserted into a hole in a workpiece, and the camming portion slides vertically towards a top portion of the receiving section. The camming surface of the first arm and the camming surface of the second arm lift the inner member out of an insertable member of the fastener, and the terminal projection of the first arm and the terminal projection of the second arm capture a head portion of the insertable member within the indent of the first arm and the indent of the second arm. When an upward force is applied, the terminal projection of the first arm and the terminal projection of the second arm lift the insertable member from the hole.

In another preferred embodiment, the terminal projection projects a distance that is less than a distance that the camming portion projects.

In another preferred embodiment, the first arm includes a first top portion and second top portion separated by a first distance. The second arm includes a third top portion and a fourth top portion separated by a second distance. The first distance being greater than the second distance. The third top portion and the fourth top portion are provided in between the first top portion and the second top portion.

BRIEF DESCRIPTION OF THE DRAWINGS

For a fuller understanding of the invention, reference is made to the following detailed description, taken in connection with the accompanying drawings illustrating various embodiments of the present invention, in which.

DETAILED DESCRIPTION

Figure 1:
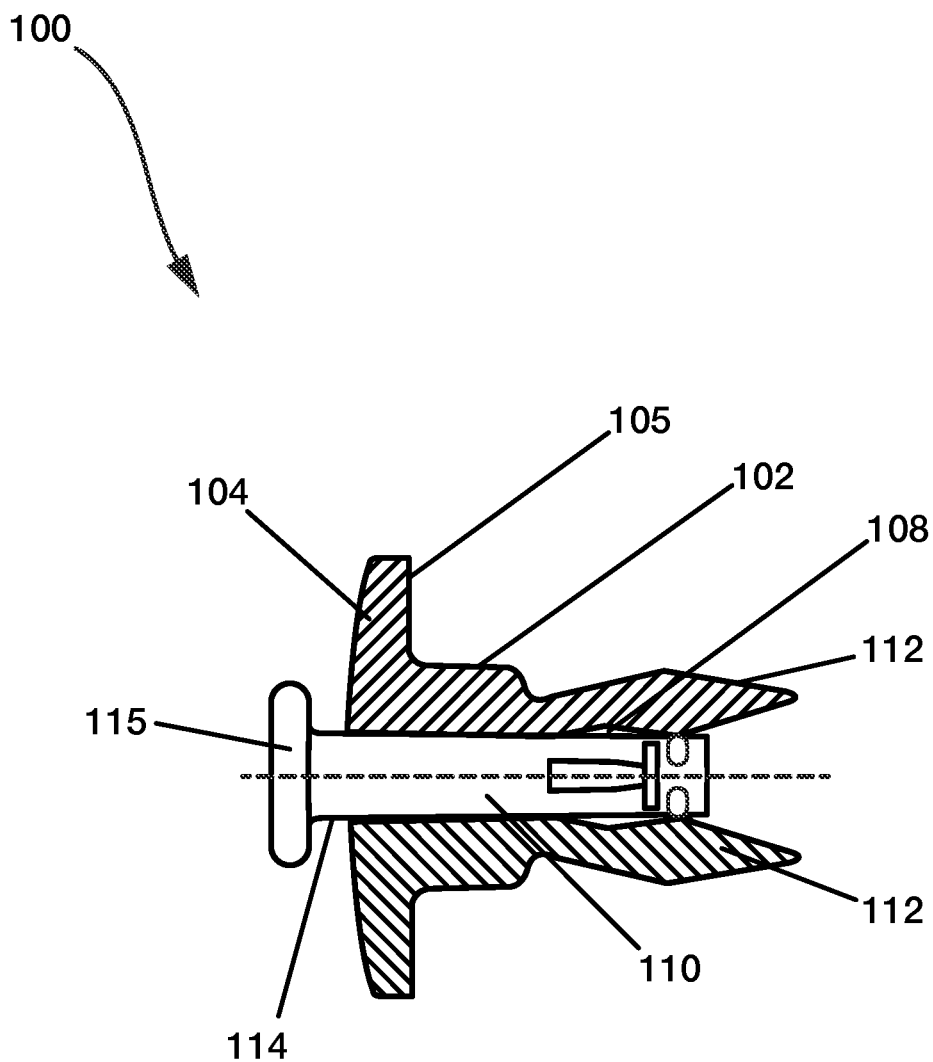
FIG. 1 is a cross-sectional view of an example panel fastener (prior art) that can be used to secure hardware to a workpiece.

FIG. 1 illustrates an example panel fastener 100 that can be used to secure hardware to a workpiece (e.g., a panel, such as a surface on a table, a bench, a vehicle, machinery, etc.). A panel fastener 100 (hereinafter referred to as a "fastener 100") can be removed from and/or inserted into a hole in the workpiece by a fastener remover and inserter tool (e.g., the present invention). The fastener 100 is a two-part unit. For example, the fastener 100 can include a substantially cylindrical the insertable member 102, and an inner member 110. The insertable member 102 has a head portion 104. The head portion 104 can include a bottom surface 105 that can abut against the workpiece when installed. Once installed to the workpiece, the head portion 104 lays generally flat against the workpiece so that a top surface of the head portion 104 can be visible. The insertable member 102 can include a hollow portion 108 that runs longitudinally through the insertable member 102.

The inner member 110 includes a head portion 115. The inner member 110 can be insertable into the hollow portion 108 of the insertable member 102. The insertable member 102 can be deformable, such that the projections 112 thereon can be flared out after the fastener 100 is inserted into a hole in a workpiece panel, effectively locking the fastener 100 in place.

The projections 112 can be biased in a contracted configuration when the inner member 110 is not fully inserted into the hollow portion 108. By inserting the inner member 110 into the hollow portion 108 of the insertable member 102, a shaft 114 of the inner member 110 forces the projections 112 outward in a flared-out configuration. This expands the bottom portion of the fastener 100 that extends through the hole, thereby making it larger than the hole so as to secure the fastener 100 within the hole of the panel.

Prior to installation, the inner member 110 is generally only partially inserted into the hollow portion 108, so that the projections 112 remain in a substantially inwardly biased configuration while the fastener 100 is inserted into the hole in the panel. After the fastener 100 has been inserted into the hole, the inner member 110 is pushed so as to be fully inserted into the hollow portion 108, thereby locking the fastener 100 within the hole in the panel.

Figure 2:
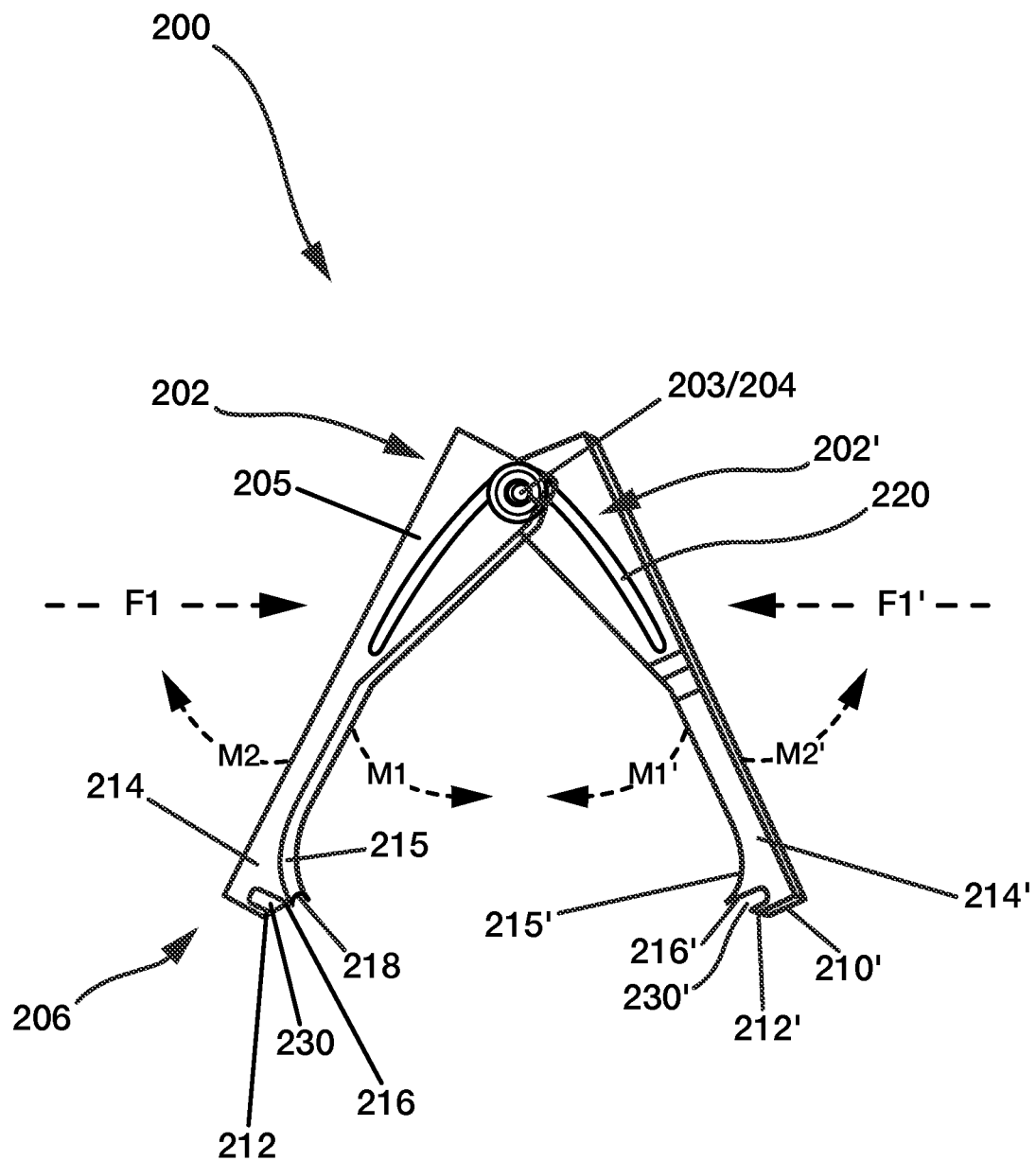
FIG. 2 is a side view a tool for removing a panel fastener from a workpiece.

FIG. 2 illustrates a tool 200 for removing fasteners, such as panel fastener 100, from a workpiece. The tool 200 facilitates easy removal of such fasteners from a workpiece, thereby saving a user of the tool 200 a substantial amount of time. Further, the tool 200 can remove fasteners in a manner that leaves the fasteners intact post-removal, allowing the fasteners to be reused.

As described in greater detail below with respect to FIGS. 15-21, the tool 200 can include additional components to facilitate relatively easy and quick insertion of fasteners 100 (e.g., into a workpiece), thereby saving a user of the tool 200 a substantial amount of time when inserting fasteners 100. Also, the tool 200 can be adapted to remove and/or insert other types of fasteners and/or hardware, other than the fasteners 100. For example, the tool 200 can be used to easily and quickly remove and/or insert fasteners that can have a different size, shape, components, and/or proportions, than those of fasteners 100 shown in FIG. 1. As a result, the tool 200 can be useful in a wide variety of applications such as removing and resetting shelving, automotive applications, craft, and construction applications, etc.

As shown in FIG. 2, the tool 200 can include a set of cooperative the arms 202, 202' (first arm 202 and second arm 202', also referred together as the "arms 202, 202'"). The arms 202, 202' each includes receiving portions 203. Also, the tool 200 can include a torsion spring 220, which includes a receiving portion 203. The torsion spring 220 is positioned in between the arms 202, 202.' The torsion spring 220 maintains the arms 202, 202' in an open position. Each of portions 203 at the arms 202, 202', and the torsion spring 220 is aligned so as to receive a pin 204. The pin 204 adjoins the arms 202, 202', and the torsion spring 220 such that the arms 202, 202' pivot about an axis of the pin 204. The arms 202, 202' can include additional components to interlock and adjoin. In some implementations, the pin 204 can be welded, soldered, or fixed in some other manner to the arms 202, 202'.

Figure 3:
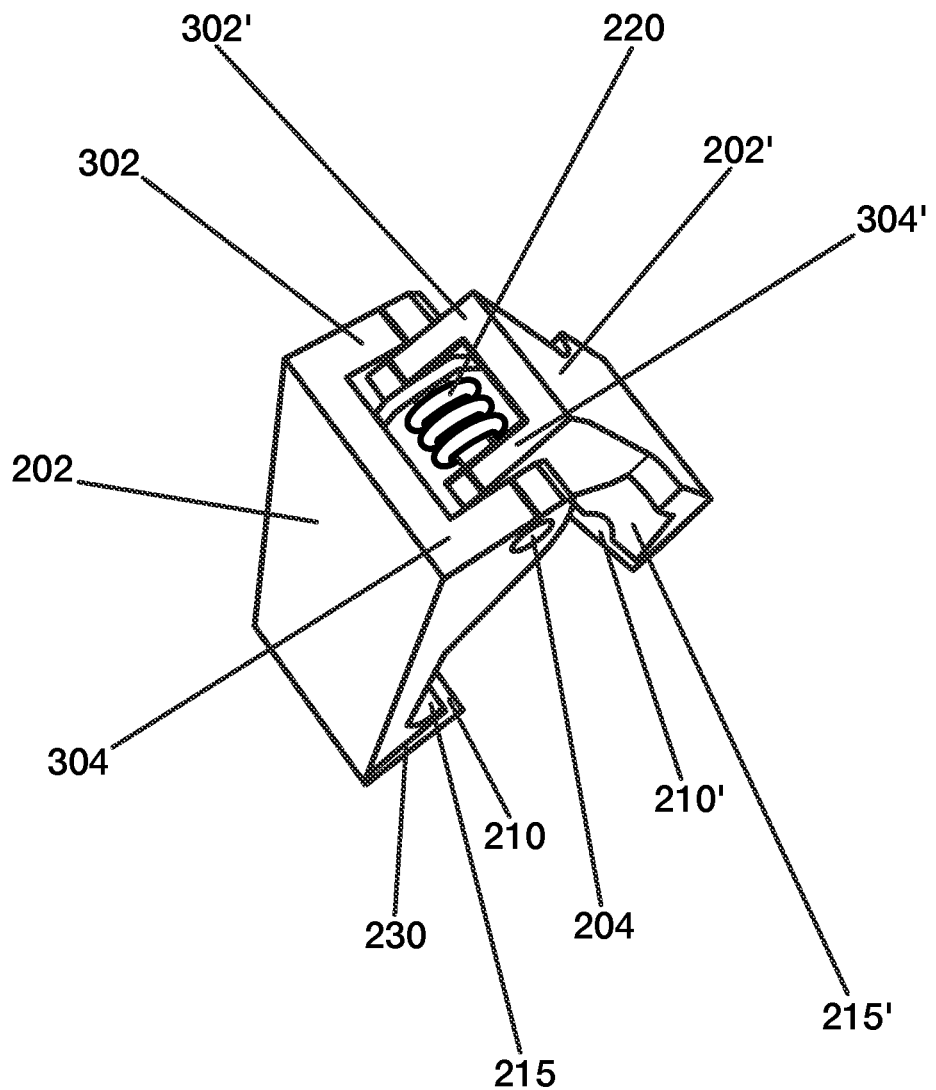
FIG. 3 is a top view of the tool of FIG. 2.

As further shown in FIGS. 2 and 3, each arm 202, 202' terminates at respective distal ends 206, 206'. The distal ends 206, 206' include the terminal projections 210, 210' that project inwardly from the end of each the arms 202, 202'. In some implementations, the terminal projections 210, 210' extend substantially perpendicularly inward from their respective the arms 202, 202'. In some implementations, the terminal projections 210, 210' are substantially rectangular. In other implementations, the terminal projections 210, 210' have rounded-over inward-facing edges 212, 212'. Inward-facing edges 212, 212' can be of any shape, such as wedge-shaped, blunt-shaped, curved, convex, concave, cammed, etc.

The arms 202, 202' further include the camming portions 214, 214'. The camming portions 214, 214' extend generally inwardly from their respective arms 202 202'. In some implementations, the camming portions 214, 214' extend inwardly a distance greater than that of the terminal projections 210, 210'. The camming portions 214, 214' include the recesses 218 and 218' (see FIG. 4, for example). The camming portions 214, 214' also include the camming surfaces 215, 215'. In some implementations, the camming surfaces 215, 215' are concave ramps, for example. The camming portions 214, 214' include base portions 216, 216' that project inwardly, and substantially orthogonally from each of the arms 202, 202'. The camming surfaces 215, 215' and the base portions 216, 216' can be, in various embodiments, rounded, blunt, pointed, and/or cammed. The indents 230, 230' are formed between the terminal projections 210, 210' and bottom portions 216, 216'.

The recesses 218, 218' that can be in a half-moon or crescent shape. In another implementation, the recesses 218, 218' can be shaped as triangular cut-outs, or another shape. In another implementation, the recesses 218, 218' can conform to the shape of the shaft 114 of the inner member 110 of the fastener 100.

With continuing reference to FIG. 2, the arms 202, 202' can pivot about an axis of the pin 203/204 when forces F1 and F1' are applied to the arms 202, 202', respectively. For example, a user of the tool 200 can simultaneously squeeze the arms 202, 202' to apply forces F1 and F1'. When the forces are applied, the arms 202, 202' can move towards each other along approximate ranges of motions M1 and M1; against a biasing force provided by the torsion spring 220. The user of the tool 200 can simultaneously squeeze the arms 202, 202' so as to grip and remove a fastener 100. When released, the torsion spring 220 provides a biasing force to return the arms 202, 202' to their original positions along approximate ranges of motion M2 and M2'. Additional details of the tool 200 in operation are described in greater detail below with respect to FIGS. 6-9.

FIG. 3 is a top view of the tool 200. As shown in FIG. 3, the arms 202, 202' each include top portions 302, 302,' 304, and 304'. The top portions 302, 304 are separated by a distance that is larger than the top portions 302', 304' so that the arms 202, 202' can interlock as shown. The torsion spring 220 is disposed between the top portions 302', 304', and the pin 204 is disposed through the receiving portions 203 of the arms 202, 202' and the torsion spring 220.

Figure 4:
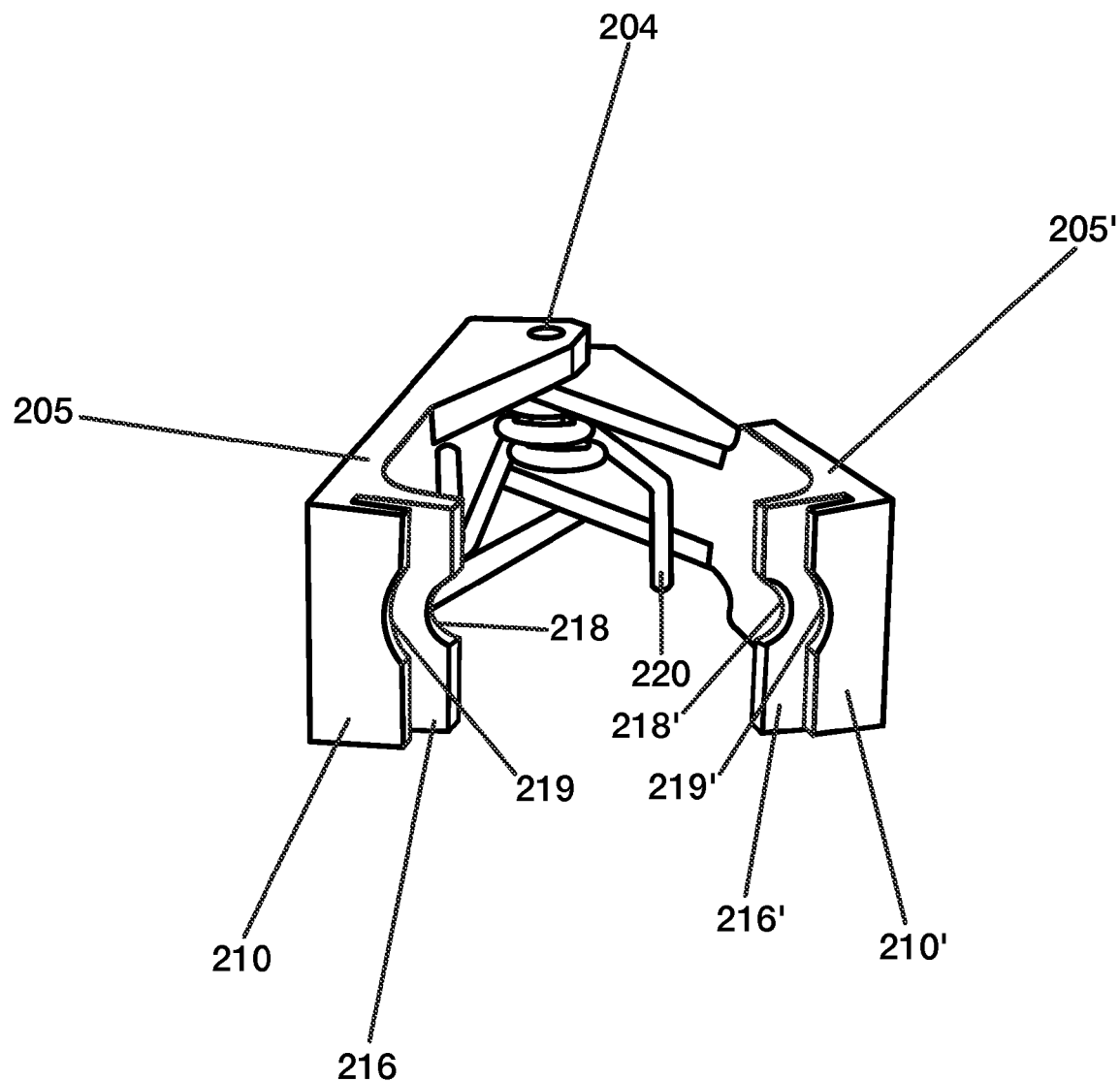
FIG. 4 is a bottom view of the tool of FIG. 2.

FIG. 4 is a bottom view of the tool 200. As shown FIG. 4, the torsion spring 220 resides within a cavity between top portions 302', 304'. Legs of the torsion spring 220 bias against the arms 202, 202' so as to keep the arms 202, 202' in an open position. As further shown, base portions 216, 216' include recesses 219, 219.'

Figure 5:
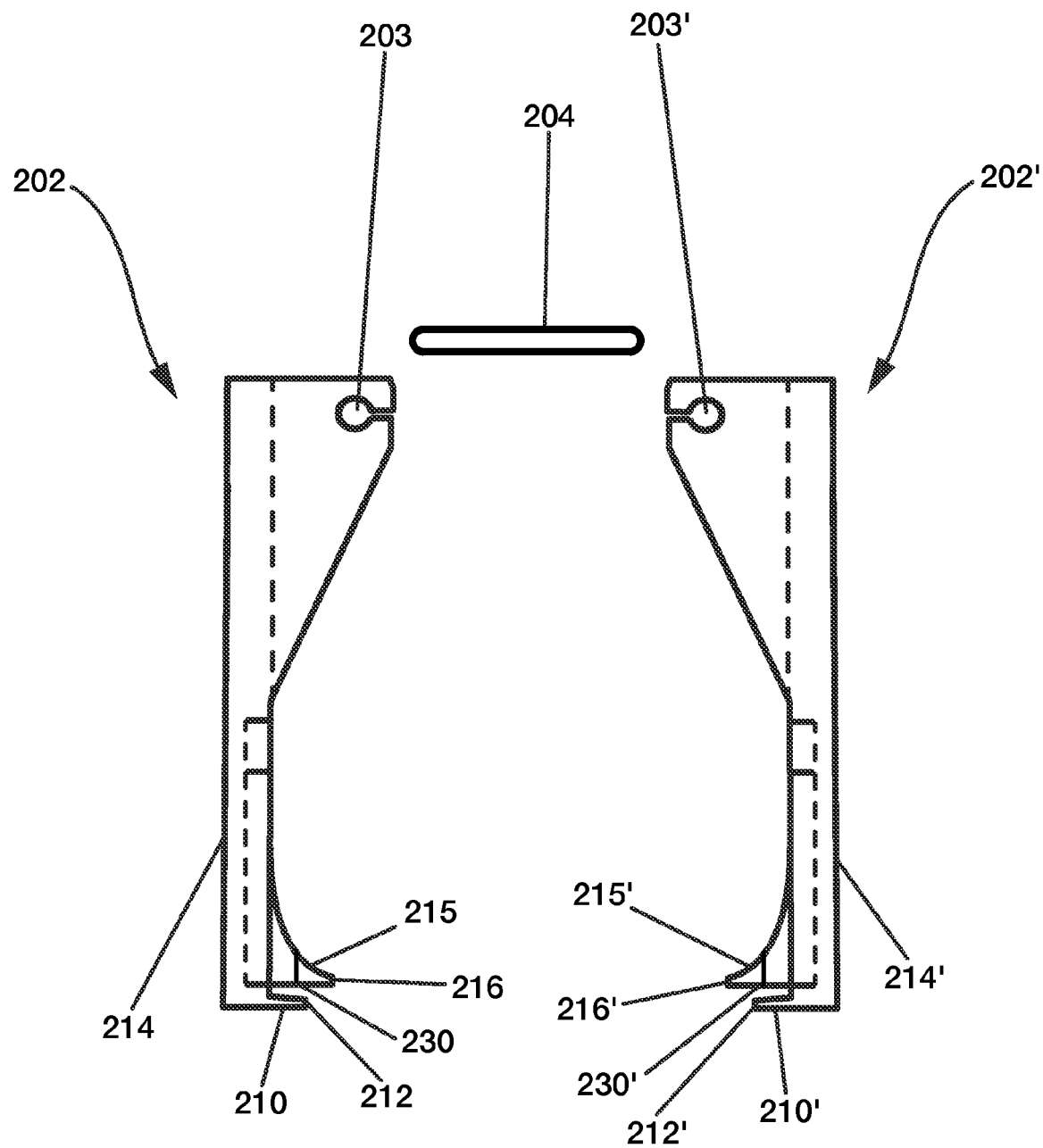
FIG. 5 is a front exploded view of the tool of FIG. 2.

FIG. 5 is a front exploded view of the tool 200. As shown in FIG. 5, the arms 202, 202', the torsion spring 220, and the pin 204 can be separate components. Components of the tool 200 can be manufactured using any number of techniques so as to form the terminal projections 210, 210', inward-facing edges 212, and 212', the camming portions 214, 214', the camming surfaces 215, 215', bottom portions 216, 216', the recesses 218, 218', and the indents 230, 230'. For example, the arms 202, 202' can be manufactured using various castings, Computer Numerical Control (CNC) machining, Computer-Aided Manufacturing (CAM) techniques, and/or other manufacturing techniques. Also, components of the tool 200 can be manufactured using any combination of materials. Further, components of the tool 200 can be assembled using any combination of assembly techniques.

Figure 6:
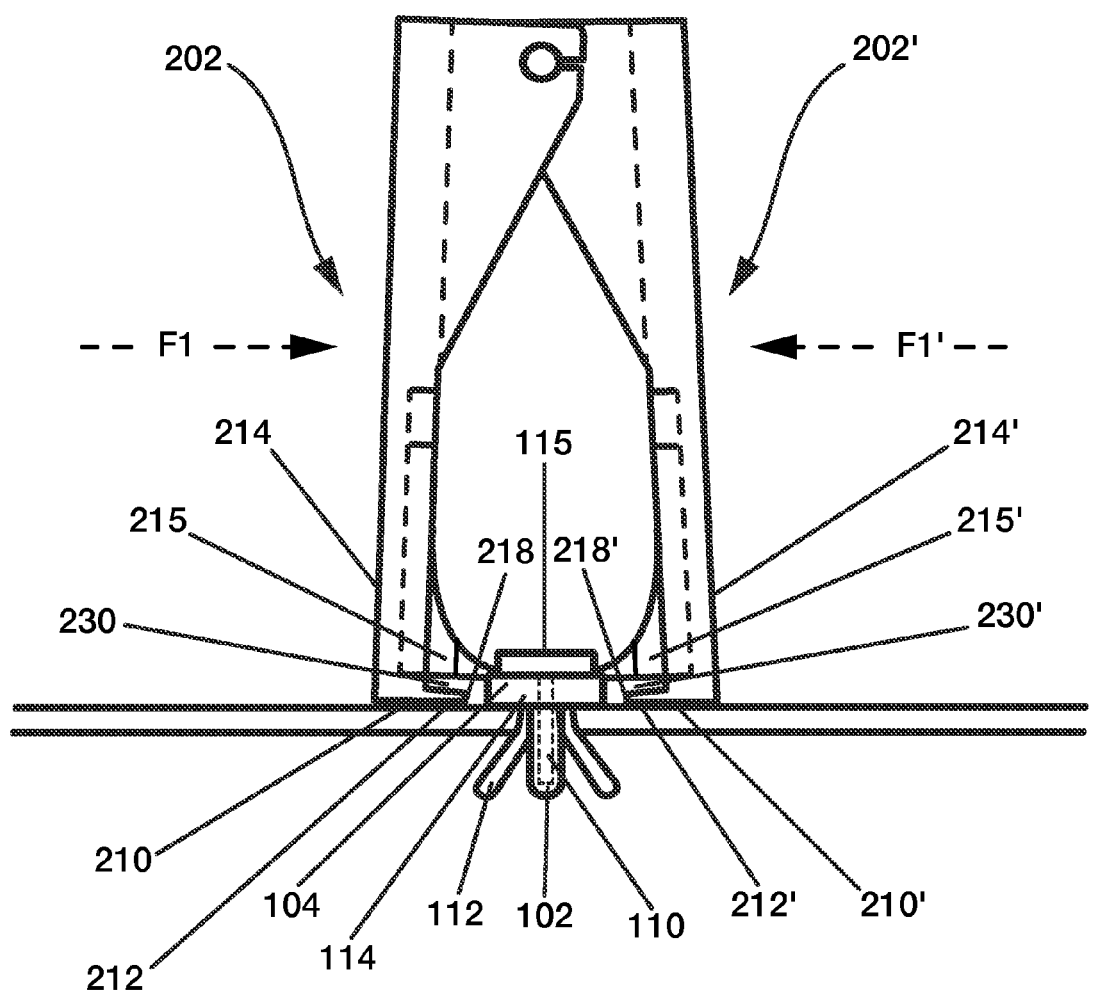
FIGS. 6-9 are side views of the tool of FIG. 2 in operation.

FIGS. 6-9 illustrate the tool 200 in operation. Referring to FIG. 6, the tool 200 can be placed over a fastener 100 currently installed in a hole in a workpiece as shown. A user of the tool 200 can simultaneously squeeze the arms 202, 202' (in the directions of forces F1 and F1') so as to contact the camming 215, 215' with the head portion 115 of the fastener 100.

Figure 7:
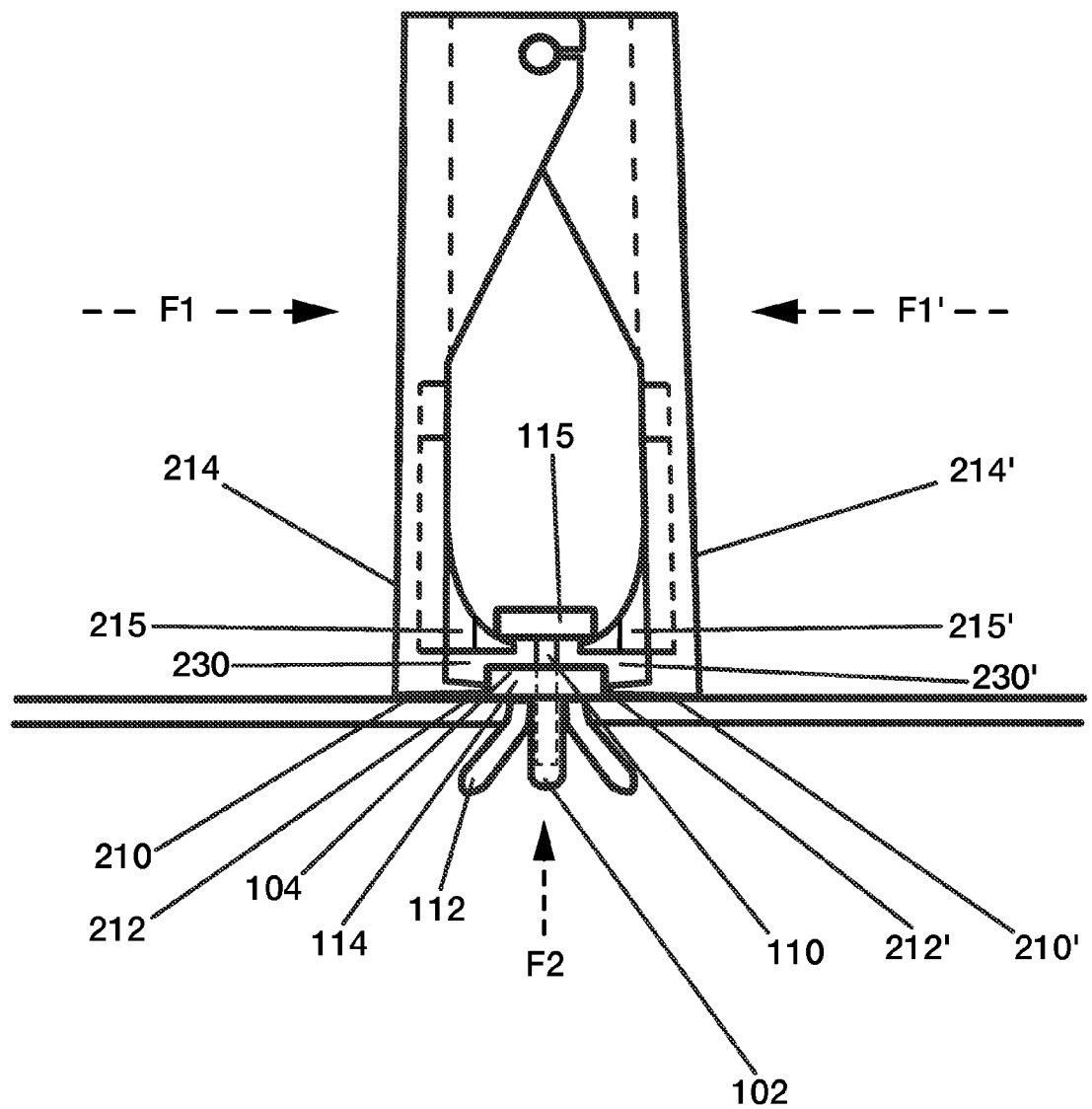

Referring to FIG. 7, the user can continue to squeeze the arms 202, 202' (in the direction of forces F1 and F1'), thereby pushing the camming surfaces 215, 215' underneath the head portion 115 and engaging the recesses 218, 218' with the inner member 110. The camming portions 215, 215' can then apply a "prying" force to the head portion 115, lifting the inner member 110 from the insertable member 102. As the inner member 110 is lifted from the insertable member 102, the projections 112 are biased inwardly and are no longer held in place by the inner member 110. Also, the inner member 110 is still partially within insertable member 102, but has released the projections 112 so that the projections 112 do not hold the insertable member 102 within the workpiece.

Figure 8:
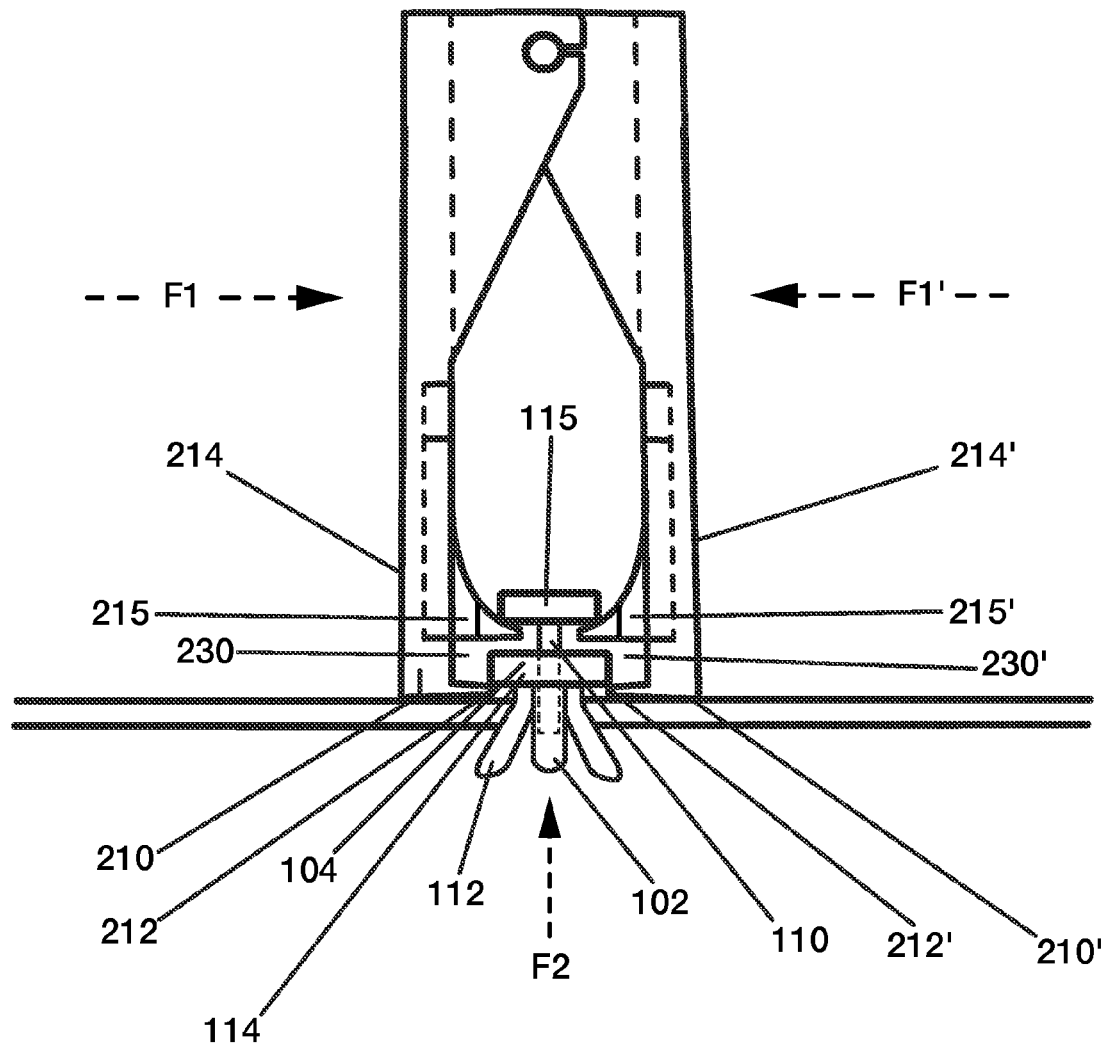
Figure 9:
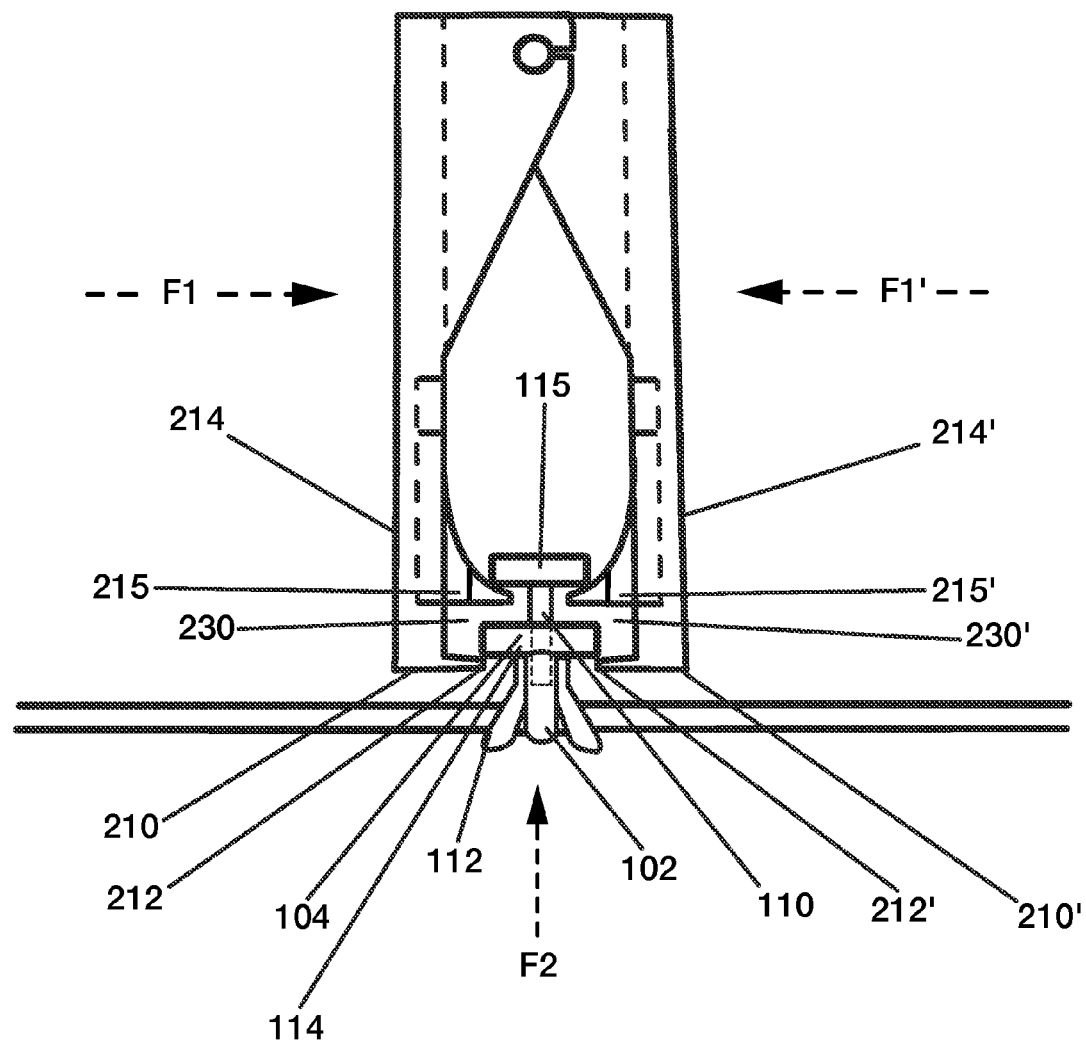

As further shown in FIG. 7, the terminal projections 210, 210' can capture the insertable member 102 once the inner member 110 has been lifted. For example, once the inner member 110 has been lifted, the insertable member 102 is no longer "locked in" to the workpiece, and is free to move upwards. The inward-facing edges 212, 212' of the terminal projections 210, 210' can slide underneath the bottom portion 105 (as shown in FIG. 8), thereby capturing the insertable member 102 within the indents 230, 230.' Once captured, the user can pull upward in the direction of force F2 (approximately perpendicularly away from the workpiece). Since the projections 112 no longer lock the insertable member 102 in place, the user can extract the insertable member 102 along with the inner member 110 from the hole in the workpiece by continuing to apply upward force, as shown in FIGS. 8 and 9.

As can be seen in FIGS. 6-9, the tool 200 facilitates relatively quick and easy removal of fasteners 100 (e.g., from a workspace), thereby saving a user of the tool 200 a substantial amount of time. Also, the tool 200 can be adapted to remove other types of fasteners and/or hardware, other than the fasteners 100. For example, the tool 200 can be used to easily and quickly remove fasteners that can have a different size, shape, components, and/or proportions, than those of the fasteners 100 shown in FIG. 1.

Figure 10:
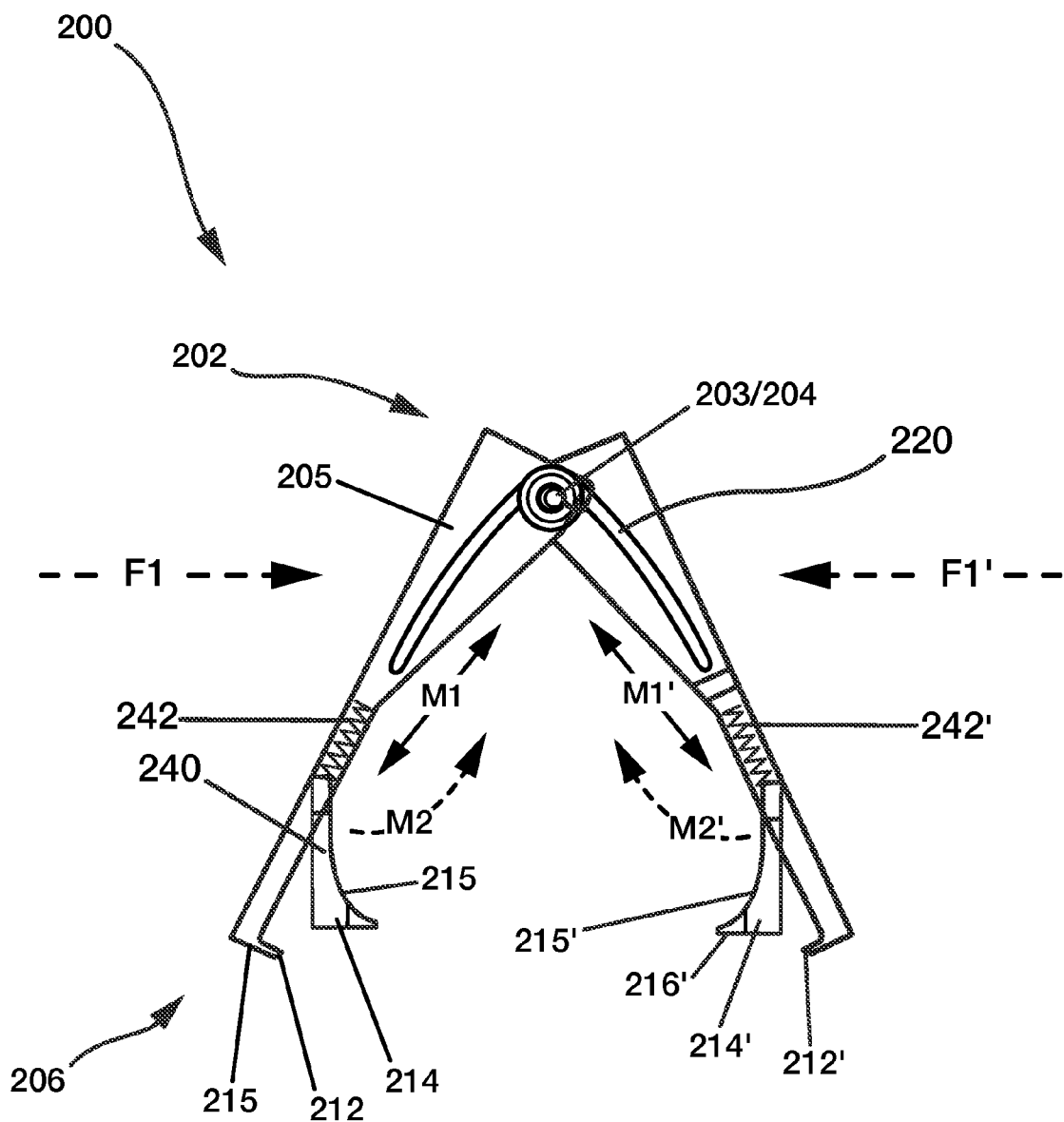
FIG. 10 is a side view of an embodiment of the tool having spring-biased cams.

FIG. 10 illustrates the tool 200 according to another embodiment. As shown in FIG. 10, the tool 200 can include components similar to those shown above. Additionally, the camming portions 214, 214' can be adjustable, and can be separate components from the arms 202, 202'. For example, the camming portions 214, 214' can be attached to the arms 202, 202' within a receiving section in a way that allows the camming portions 214, 214' to slide along ranges of motion M1 and M1' (e.g., as described in greater detail below with respect to FIG. 11). In some implementations, the camming portions 214, 214' can be attached to the arms 202, 202' via a pin or screw 246 (as shown in FIG. 12). Also, springs 242, 242' can be provided to return the camming portions 214, 214' in the direction of M1'. As a result of the sliding motion, the camming portions 214, 214' are able to accommodate fasteners 100 having top portions 115 of different heights. Hinges 240 and 240' can be attached to the camming portions 214, 214' to permit the camming portions 214, 214' to rotate freely (e.g., along ranges of motion M2 and M2') so as to accommodate fasteners 100 of different widths. Because of this versatility, the tool 200 can be used to grip and remove fasteners 100 of various widths, heights, and shapes. As such, the tool 200 is an "all-in-one" solution for the removal of a wide range of fasteners.

Figure 11:
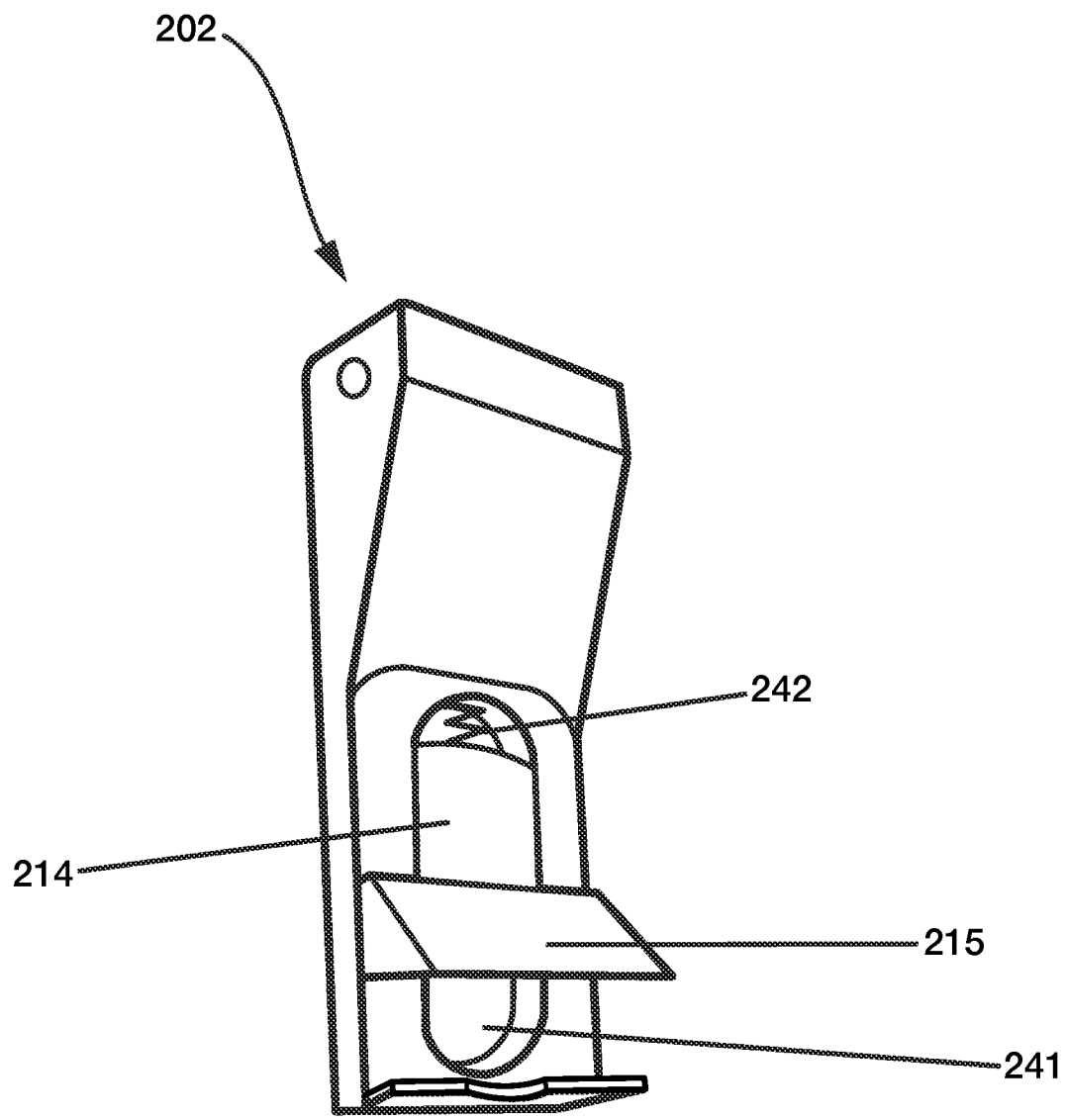
FIG. 11 is an oblique solid view of details of an arm of the tool of FIG. 10.
Figure 12:
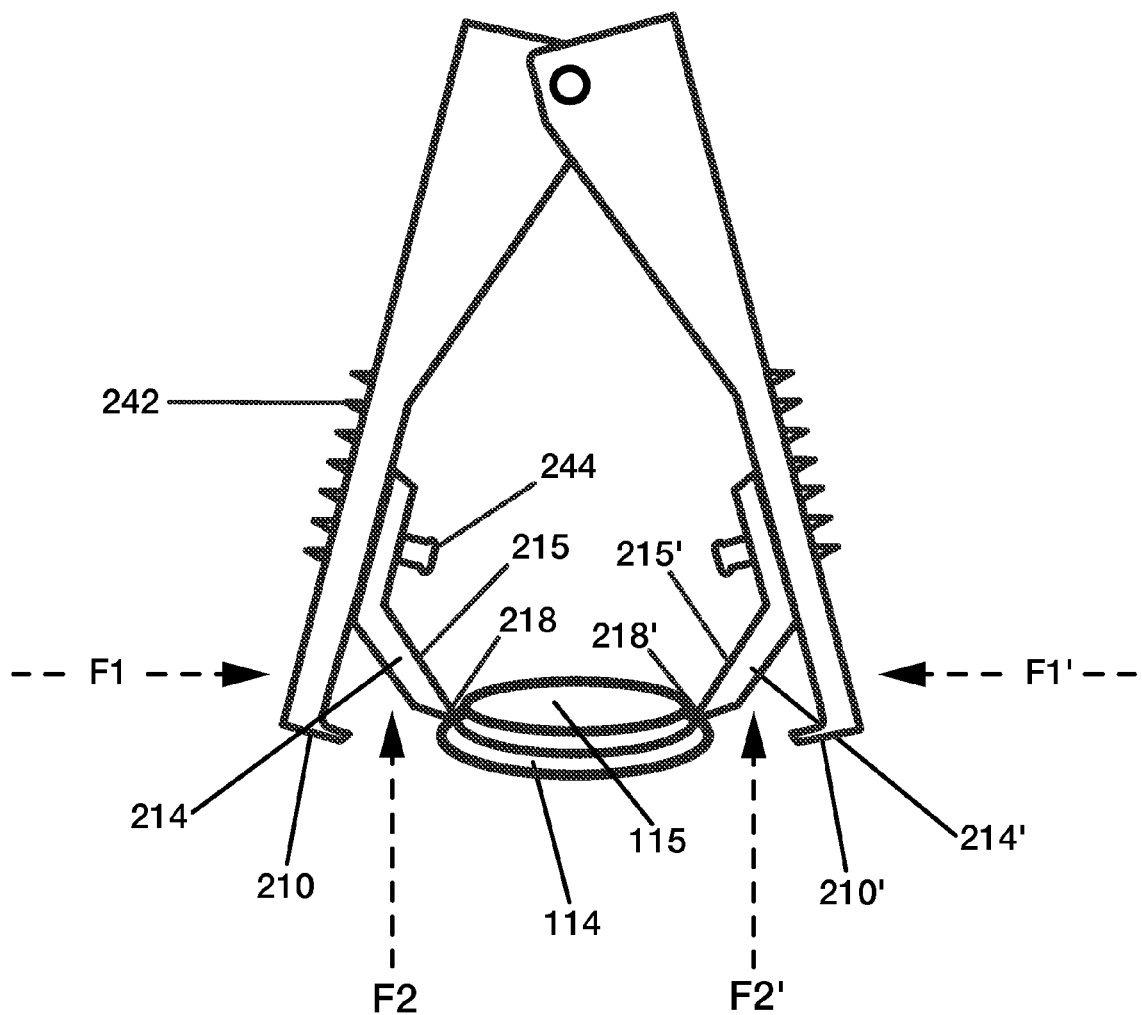
FIGS. 12 and 13 are side views of the tool of FIG. 10 in operation.

FIG. 11 illustrates details of an arm 202 of the tool 200. As shown in FIG. 11, arm 202 can include a receiving section 241. The camming portion 214 can be provided within the receiving section 241. A spring 242 can be provided in between a top portion of the camming portion 214 and a top portion of the receiving section 241. The camming portion 214 can slide freely within receiving section 241 to accommodate fasteners of different heights. The spring 242 biases the camming portion 214 downward, so as to tighten a grip of the camming portion 214 to the head portion 115 of a fastener 100. In an embodiment, the receiving section 241 can be of a shape and dimension to accommodate a camming portion 214 having a complimentary size and dimension, such as a T-slot or dovetail slot. In another embodiment, each arm 202 can include an aperture engaging a boss or similar projection with the camming portions 214 so as to index the camming portions 214 to a desired position. Alternatively, the camming portion 214 can simply be secured to the arm using fasteners that pass through this aperture. Arm 202' can also include similar components to those of arm 202.

Figure 13:
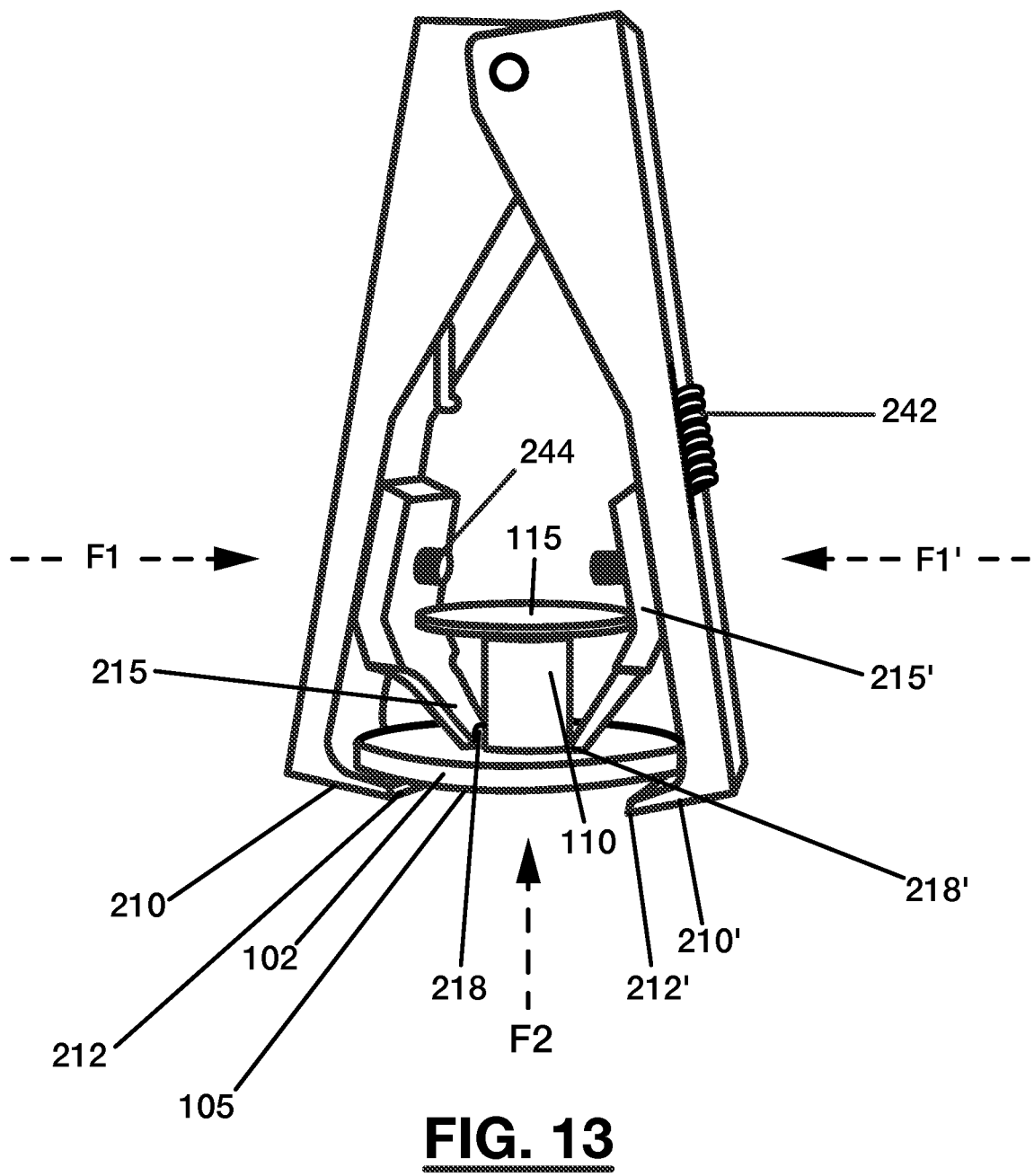

FIGS. 12 and 13 illustrate the tool 200 in operation. As shown in FIG. 12, the tool 200 can be positioned over a fastener 100 so as to remove the fastener 100. A user of the tool 200 can engage the top portion 115 of the fastener 100 with the camming surfaces 215, 215' (e.g., by squeezing arms 202, 202' in the direction of forces F1 and F1'). The user then pushes downwardly so as to engage the terminal ends 110, 110' with the head portion 104 of the insertable member 102. The downward force causes the camming portions 214, 214' to slide upward (e.g., in the direction of forces F2 and F2') so that the camming portions 214, 214' and camming surfaces 215, 215' maintain contact with top portion 115, while permitting the terminal ends 210, 210' to move downward towards head portion 104. As a result of the sliding motion of the camming portions 214, 214', the tool 200 can be used to remove fasteners 100 having top portions 115 and head portions 104 of different heights.

Referring to FIG. 13, the user can continue to squeeze the arms 202, 202' (e.g., in the direction of forces F1 and F1'), thereby pushing the camming portions 215, 215' underneath the head portion 115. The camming portions 215, 215' can then apply a "prying" force to the head portion 115, lifting the inner member 110 from the insertable member 102 and releasing the projections 112 from the workpiece. As further shown in FIG. 13, the terminal projections 210, 210' can capture the insertable member 102 once the projections 112 have been released. For example, the inward-facing edges 212, 212' of the terminal projections 210, 210' can slide underneath the bottom portion 105, thereby capturing the insertable member 102 within the indents 230, 230.' Once captured, the user can pull upward in the direction of force F2 (e.g., approximately perpendicularly away from the workpiece) to extract the insertable member 102 along with the inner member 110 from the hole in the workpiece.

While the camming portions 214, 214' are shown as riding in receiving portions of the tool 200, other variations are possible to what is shown. For example, in some implementations, the camming portions 214, 214' can ride in a slot defined by each arm 202, 202' so that longitudinal adjustability of the camming portions 214, 214' is concomitantly defined by the shape and dimension of the slots. A mechanical fastener, camming device, boss, etc. can secure the camming portions 214, 214' in the desired position in each slot. These points can be symmetrical or not. In another embodiment, the camming portions 214, 214' can engage a series of detents so that camping portions 214, 214' can be set at multiple, different, predetermined, positions along the arms 202, 202'.

As shown in FIGS. 12 and 13, the tool 200 can be used to remove fasteners 100 having top portions 115 and head portions 104 of different heights. Because of this versatility, the tool 200 is an "all-in-one" solution for the removal of a wide range of fasteners.

Figure 14:
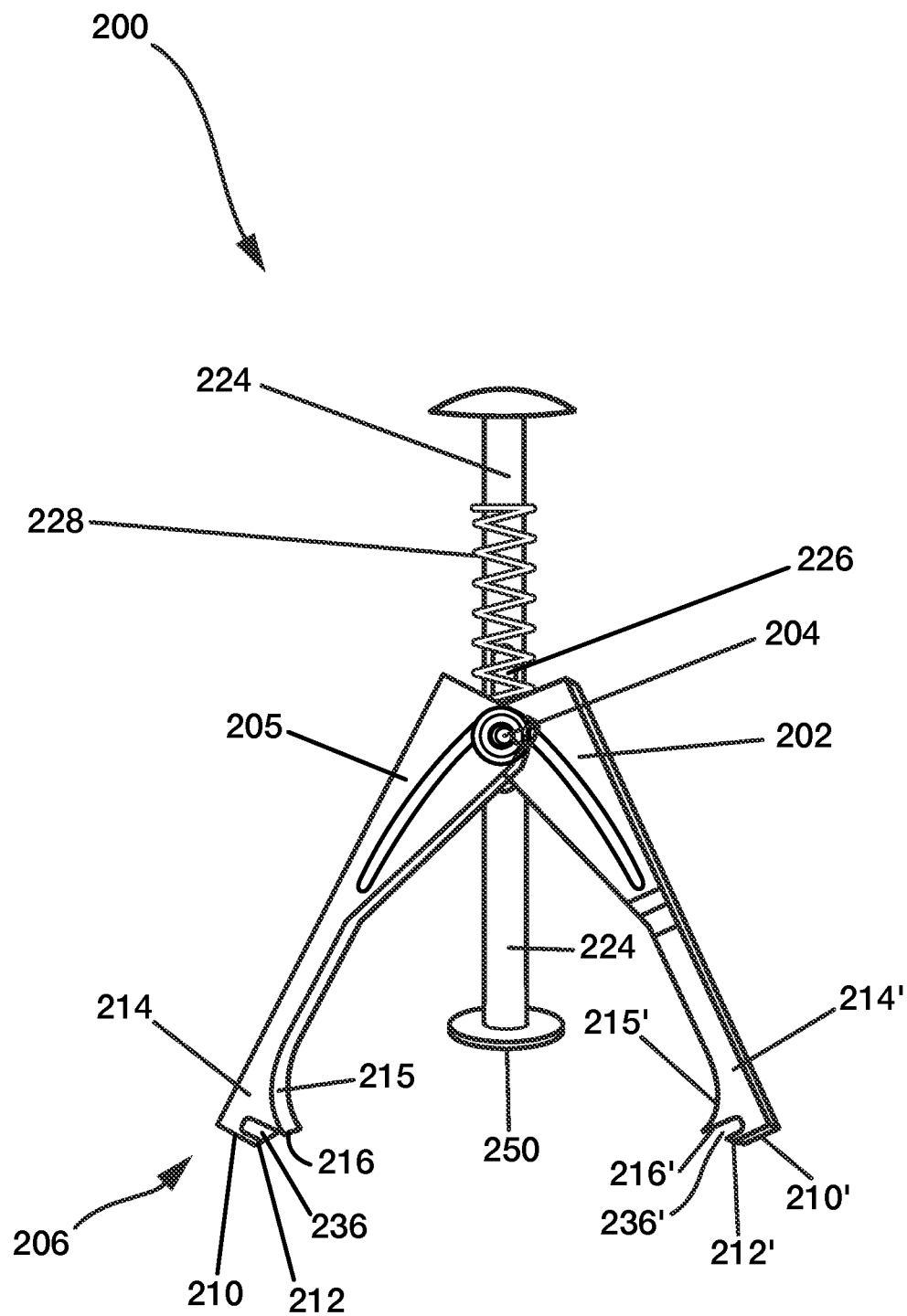
FIG. 14 is a side view of an embodiment of the tool including a plunger for inserting a panel fastener.

FIG. 14 illustrates an overview of the tool 200 in accordance with another embodiment. The tool 200 can include similar components as those described above. In addition, the tool 200 can also include push pin 224 that is used to facilitate easy insertion of fasteners 100. The push pin 224 is positioned between the arms 202, 202' such that a user can grip the arms 202, 202', for example without limitation, with a thumb on one arm 202 or 202' and at least one of a pinky finger, ring finger, and middle finger, on the opposing arm 202 or 202', such that the user's palm is free to depress the push pin 224. The push pin 224 has a longitudinal slot 226 in the shaft of the push pin 224 that allows the pin 204 to be installed therethrough, thereby providing a motion path for the push pin 224 to follow, such that the push pin 224 is oriented substantially orthogonally to the head 104 of a fastener 100 when it is engaged by the tool 200. The slot 226 also, when the pin 204 is installed therethrough, prevents the push pin 224 from disengaging from the tool 200. Lastly, the slot 226 serves to limit the travel of the push pin 224. So as to keep the push pin 224 biased in an open position, a spring 228 can be provided. The spring 228 can be a coil spring, or other type of biasing mechanism. As shown in FIG. 14, the push pin 224 can move vertically along approximate ranges of motion M1 and M2. Also, the push pin 224 can include a washer 250 that abuts against the head portion 115 when inserting the fastener 100 into a workpiece.

Figure 15:
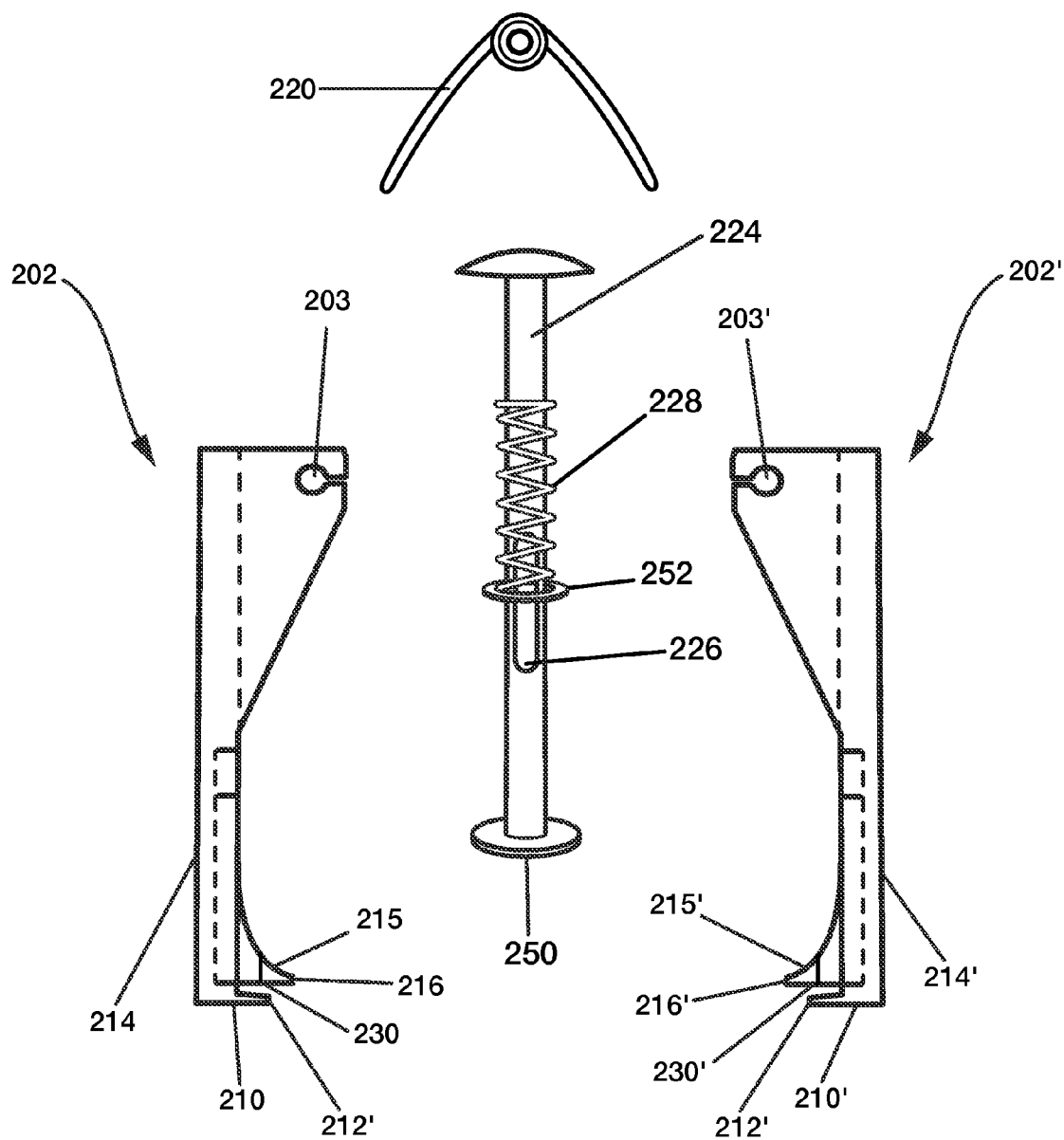
FIG. 15 is an exploded view of the tool of FIG. 14.

FIG. 15 illustrates an exploded view of the tool 200 of FIG. 14. The tool 200 includes similar components to those shown above. In addition, the tool 200 includes a washer 252, which is a base against which the spring 228 rests. Also, the washer 252 provides a reaction force against which the spring 228 compresses when the push pin 224 is pressed downwardly.

Figure 16:
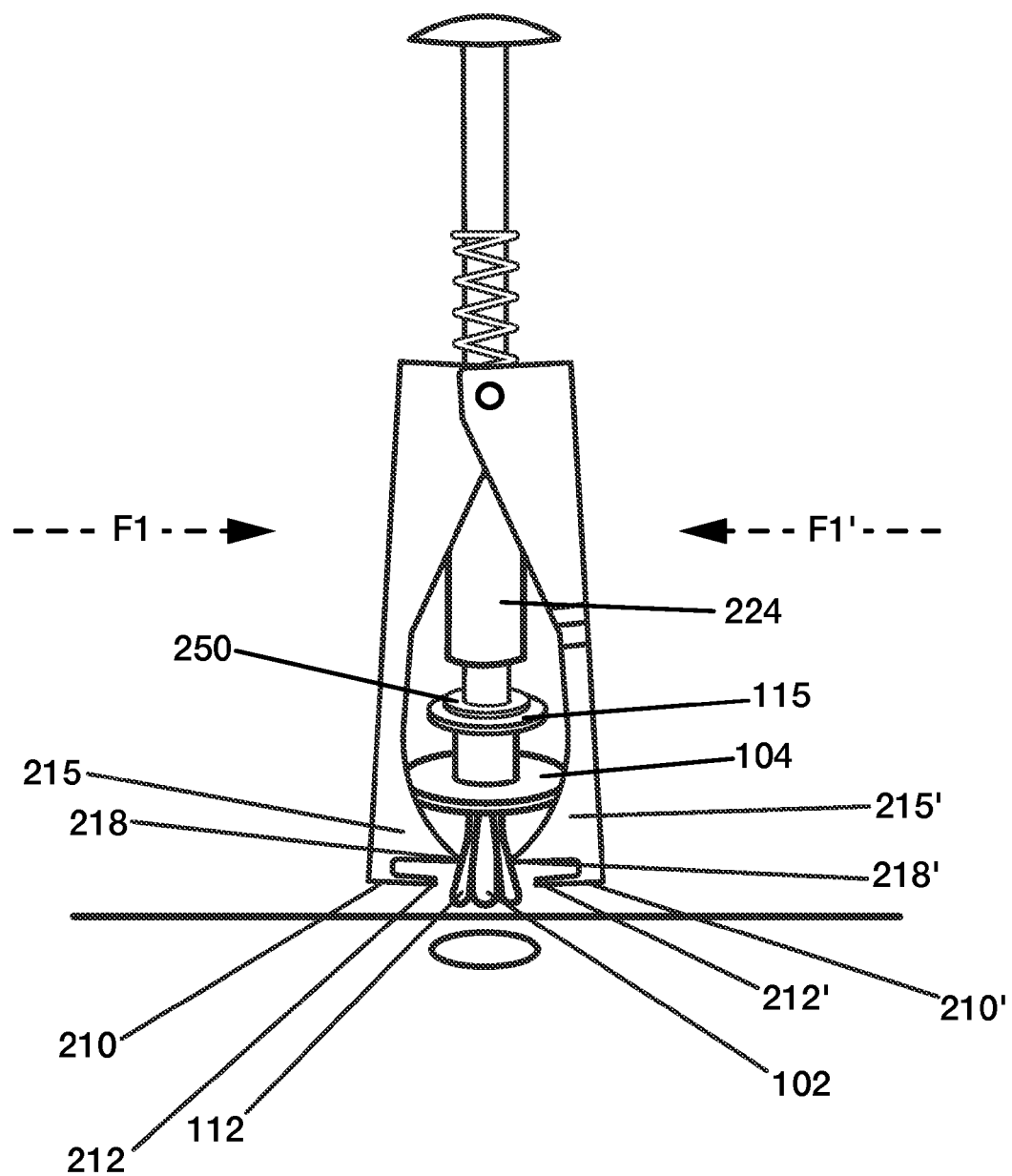
FIGS. 16-20 illustrate the tool of FIG. 14 in operation.

FIGS. 16-20 illustrate the tool 200 of FIG. 14 in operation. As shown in FIG. 16, a user can grip a fastener 100 using the tool 200 prior to installation of the fastener 100 in a workpiece. Prior to installation, the inner member 110 is partially inserted within the insertable member 102 so that the projections 112 are not locked in to place. As described below, the push pin 224 will eventually press the inner member 110 into the insertable member 102, causing the projections 112 to push outwardly and lock the insertable member 102 into the workpiece.

The user can squeeze the arms 202, 202' (in the direction of forces F1 and F1') so as to grip the projections 112 of the insertable member 102 of the fastener 100 via the terminal projections 210, 210'. Also, the user can depress the push pin 224 to make contact between the push pin 224 and the top portion 115 of the inner member 110 via the washer 250 so as to maintain the inner member 110 partially within the insertable member 102.

When the insertable member 102 is gripped, the terminal projections 210, 210' and the recesses 218, 218' maintain the projections 112 in an inward position so that the profile of the insertable member 102 is such that it will fit into a hole in a workpiece. This is particularly valuable when using old or used fasteners, because the projections 112 can be deformed such that they are biased in a flared out position even in the absence of an the inner member 110, pressing the projections 112 outward.

As further shown in FIG. 16, the camming surfaces 215, 215' also grip the insertable member 102 (e.g., at the head portion 115). As shown, each piece of the fastener 100 is securely gripped by the tool 200, thereby facilitating easy insertion of the insertable member 102 into the workpiece while the projections 112 are held inwardly.

Figure 17:
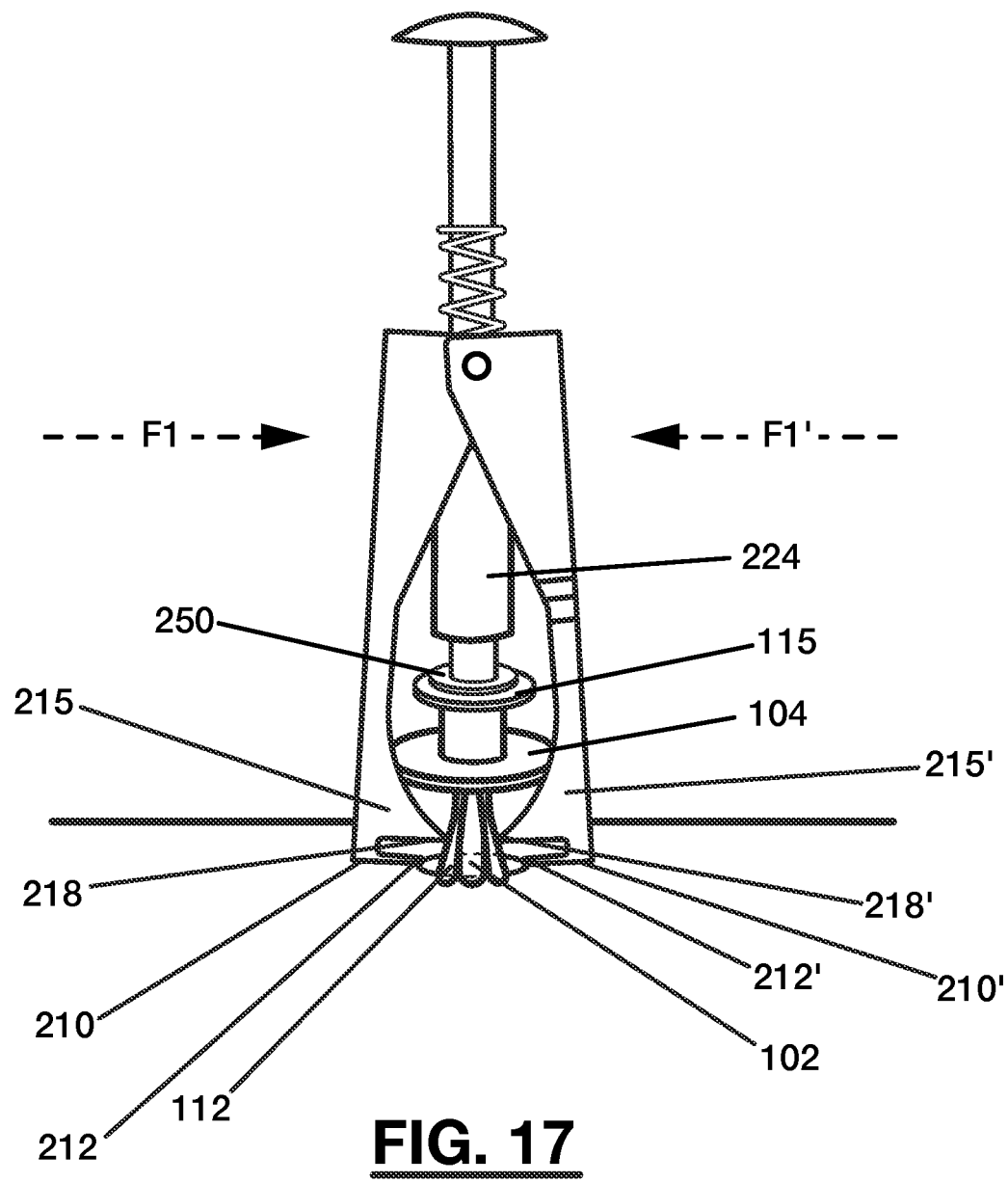

Referring to FIG. 17, the user can place the projections 112 into the hole in the workpiece while the terminal projections 210, 210' maintain the projections 112 in an inward position.

Figure 18:
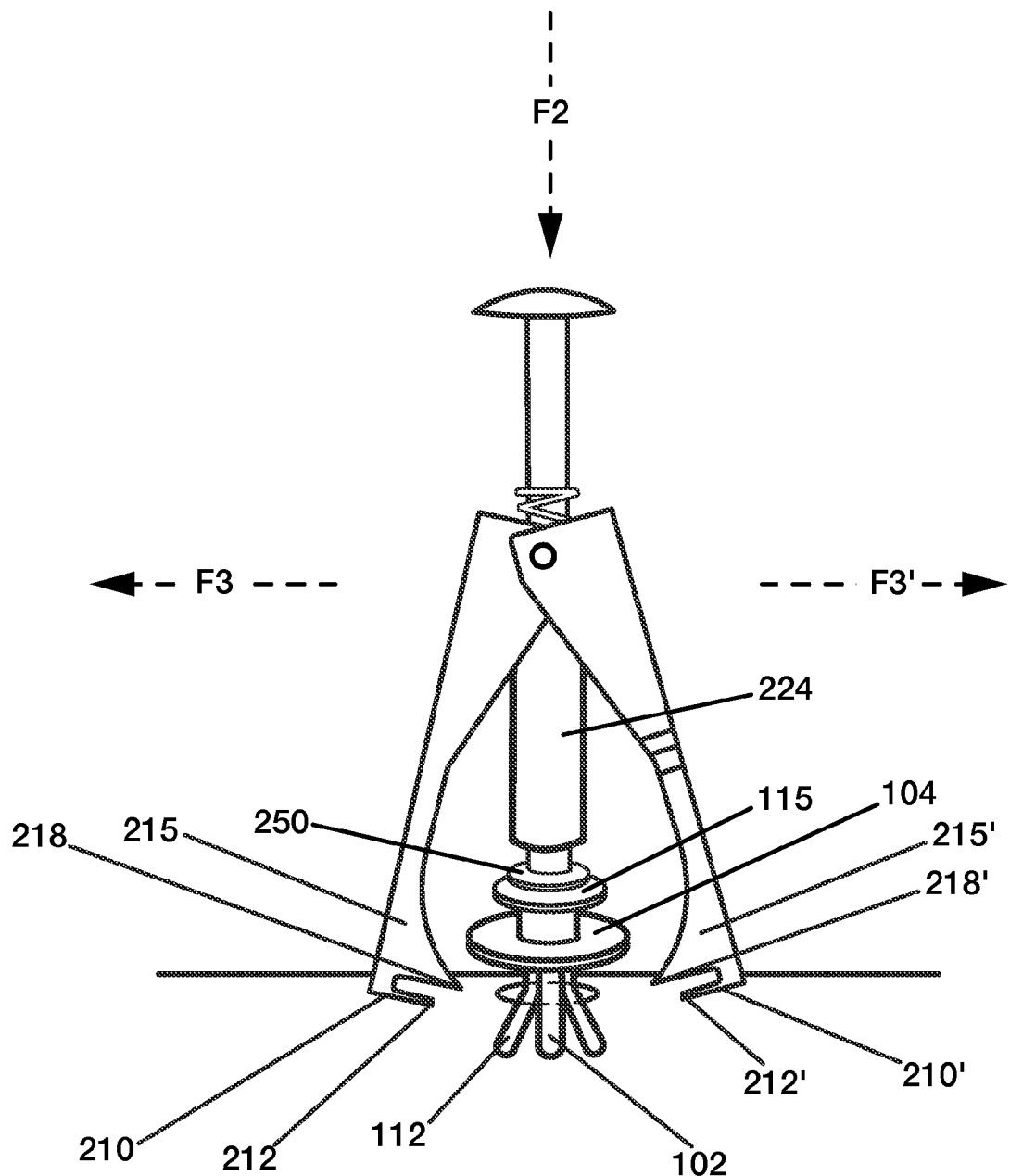
Figure 19:
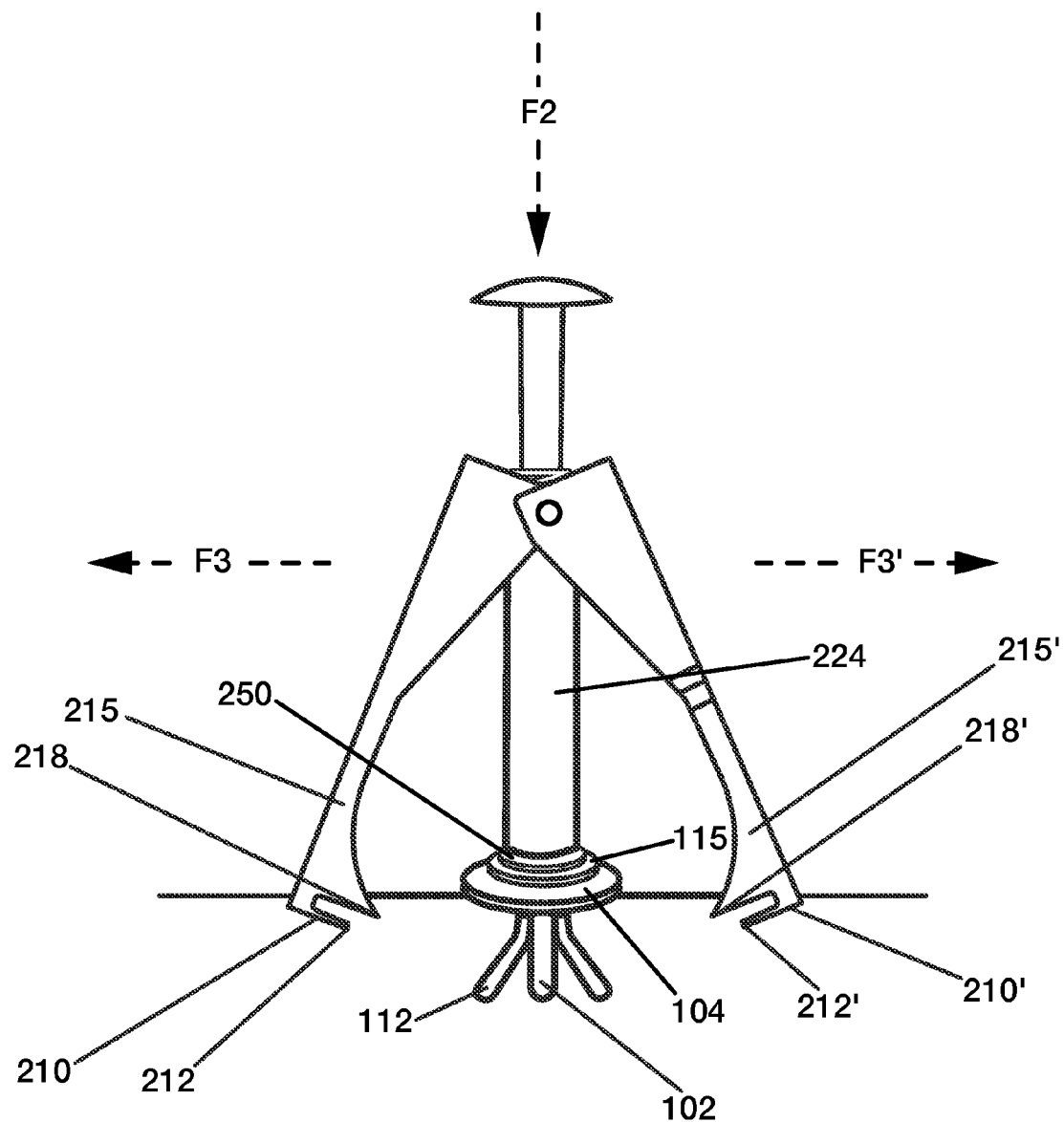
Figure 20:
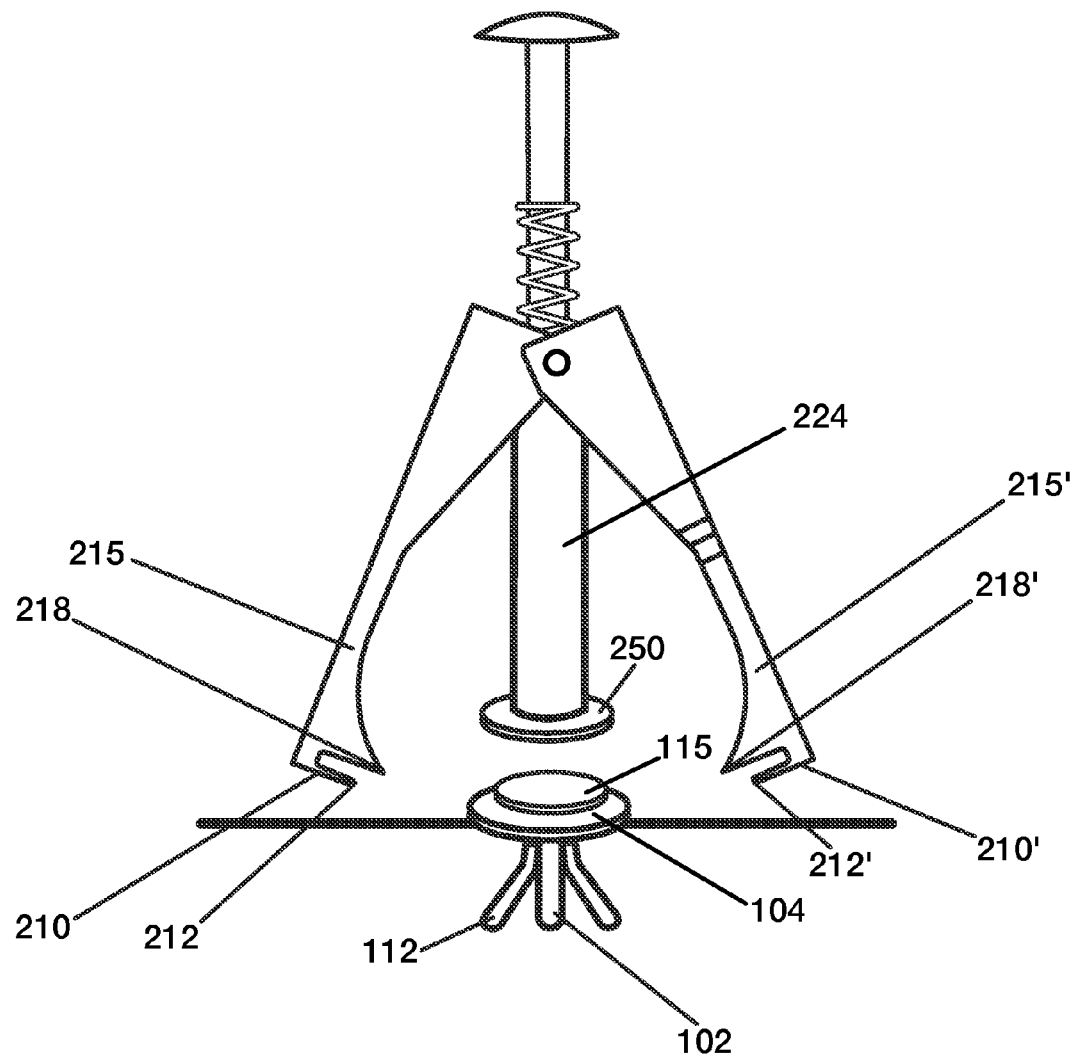

Referring to FIGS. 18-19, the user can slowly release the arms 202, 202' (as indicated by biasing forces F3 and F3' provided by the torsion spring 220) while pressing the push pin 224 downward towards the workpiece (in the direction of force F2) to the inner member 110. Further, the push pin 224 presses the inner member 110 into the insertable member 102, and, in turn, pushes the projections 112 outward to lock the insertable member 102 in the workpiece, and lock the inner member 110 within the insertable member 102. The push pin 224 presses insertable member into the workpiece, thereby ensuring a complete and firm insertion of fastener 100 into the workpiece. As shown in FIG. 20, the completed insertion of fastener 100 has been accomplished using only the tool 200. This insertion can be completed with a single hand, so installing a fastener 100, particularly in a difficult to reach area, is greatly simplified.

The tool 200 facilitates both removal and insertion of two-piece panel fasteners, such as fasteners 100. Further, the tool 200 can remove two-piece panel fasteners safely, i.e., without damaging the adjacent panel surface or the two-piece panel fastener itself. Also, the fasteners removed with the tool 200 can be reused, yielding cost savings. Additionally, the tool 200 can remove fasteners in areas with minimal clearance, allowing a user of the tool 200 to access fasteners in relatively tight spaces. Further, the tool 200 can include components that permit the tool 200 to adapt to fasteners of different heights and widths. Thus, the tool serves 200 as an "all-in-one" solution for the removal and insertion of a wide variety of panel fasteners used in various applications.

Embodiments of the invention are described herein in connection with an apparatus for inserting and removing panel fasteners. It is to be understood, however, that the invention is not limited to the specific sizes, shapes, or applications described.

It is to be understood that the disclosure in this specification includes all possible combinations of such particular features, regardless of whether a combination is explicitly described. For example, where a particular feature is disclosed in the context of a particular aspect or embodiment of the invention, that feature can also be used, to the extent possible, in combination with and/or in the context of other particular aspects and embodiments of the invention, and in the invention generally.

Other modifications and implementations will occur to those skilled in the art without departing from the spirit and the scope of the invention as claimed. Accordingly, the above description is not intended to limit the invention, except as indicated in the following claims.

What is claimed is:

1. A tool configured to remove a fastener from a workpiece, the fastener including an insertable member configured for insertion into a hole in the work piece and an inner member within the insertable member, wherein the insertable member expands in response to inward axial movement of the inner member within the insertable member to retain the fastener within the hole, the tool comprising:
- a first arm pivotally connected to a second arm, each of the first arm and second arm including:
  - a camming portion having a camming surface;
  - a terminal projection projecting substantially perpendicular and inwardly from the camming portion; and
  - an indent between the camming portion and the terminal projection; and
- wherein upon pivoting the first arm and the second arm towards each other, the camming surface of the first arm and the camming surface of the second arm each engage a top portion of the inner member of the fastener inserted into the hole in the workpiece,
- the pivoting further causing the camming surface of the first arm and the camming surface of the second arm to lift the inner member in an outward axial direction out of the insertable member of the fastener,
- the terminal projection of the first arm and the terminal projection of the second arm being configured to capture a head portion of the insertable member within the indent of the first arm and the indent of the second arm,
- wherein when an upward force is applied with the first arm and the second arm pivoted towards one another, the terminal projection of the first arm and the terminal projection of the second arm lift the insertable member to remove the fastener from the hole, wherein the first arm includes a first top portion and second top portion separated by a first distance,
- wherein the second arm includes a third top portion and a fourth top portion separated by a second distance, the first distance being greater than the second distance, and
- wherein the third top portion and the fourth top portion are provided in between the first top portion and the second top portion.

2. The tool of claim 1, further comprising:
a biasing member connected to the first arm and the second arm, the biasing member biasing the first arm and second arm away from each other.

3. The tool of claim 1, wherein each of the first arm and the second arm include a receiving portion, the tool further comprising:
a pin provided through the receiving portion of the first arm and the receiving portion of the second arm, pivotally connecting the first arm and the second arm.

4. The tool of claim 1, wherein the camming surface of the first arm or the camming surface of the second arm include a concave ramp.

5. A tool configured to remove a fastener from a workpiece, the fastener including an insertable member configured for insertion into a hole in the work piece and an inner member within the insertable member, wherein the insertable member expands in response to inward axial movement of the inner member within the insertable member to retain the fastener within the hole, the tool comprising:
- a first arm pivotally connected to a second arm, each of the first arm and second arm including:
  - a camming portion having a camming surface;
  - a terminal projection projecting substantially perpendicular and inwardly from the camming portion; and
  - an indent between the camming portion and the terminal projection; and
- wherein upon pivoting the first arm and the second arm towards each other, the camming surface of the first arm and the camming surface of the second arm each engage a top portion of the inner member of the fastener inserted into the hole in the workpiece,
- the pivoting further causing the camming surface of the first arm and the camming surface of the second arm to lift the inner member in an outward axial direction out of the insertable member of the fastener,
- the terminal projection of the first arm and the terminal projection of the second arm being configured to capture a head portion of the insertable member within the indent of the first arm and the indent of the second arm,
- wherein when an upward force is applied with the first arm and the second arm pivoted towards one another, the terminal projection of the first arm and the terminal projection of the second arm lift the insertable member to remove the fastener from the hole; and
- a push pin connected to the first arm and the second arm, via a pin provided through receiving portions of the first arm, the second arm, and the push pin,
- the push pin configured to slide vertically, engage the inner member of the fastener, and press the inner member into the insertable member of the fastener.

6. A tool to insert a fastener from a workpiece, the fastener including an insertable member configured for insertion into a hole of the workpiece and an inner member within the insertable member, wherein projections of the insertable member expand to an outward position in response to inward axial movement of the inner member within the insertable member to retain the fastener within the hole, the tool comprising:
- a first arm pivotally connected to a second arm, each of the first arm and second arm comprising:
  - a camming portion;
  - a camming surface provided on the camming portion;
  - a terminal projection projecting substantially perpendicular and inwardly from the camming portion;
- an indent between the camming portion and the terminal projection;
- a push pin connected to the first arm and the second arm, via a pin provided through receiving portions of the first arm, the second arm, and the push pin, the push pin configured to slide vertically; and
- wherein upon pivoting the first arm and the second arm towards each other, the camming portion of the first arm and the camming portion of the second arm each engage projections of the insertable member of the fastener and maintain the projections in an inward position,
- the camming surface of the first arm and the camming surface of the second arm capturing a head portion of the insertable member, and
- wherein downward force applied to the push pin causes the pushpin to press the inner member into the insertable member in the inward axial direction, press the insertable member in to a hole in the workpiece, and press the projections of the insertable member into the outward position.

7. The tool of claim 6, wherein the terminal projection projects a distance that is less than a distance that the camming portion projects.

8. The tool of claim 6, wherein the camming surface of the first arm includes a concave ramp.

9. The tool of claim 6, wherein the first arm includes a first top portion and second top portion separated by a first distance,
wherein the second arm includes a third top portion and a fourth top portion separated by a second distance, the first distance being greater than the second distance, wherein the third top portion and the fourth top portion are provided in between the first top portion and the second top portion.

10. A panel fastener tool comprising:
a first arm pivotally connected to a second arm, each of the first arm and second arm including:
 a camming portion having a camming surface; and
 a terminal projection projecting substantially perpendicular and inwardly from the camming portion; and
 an indent between the camming portion and the terminal projection;
a push pin connected to the first arm and the second arm, via a pin provided through receiving portions of the first arm, the second arm, and the push pin, the push pin configured to slide vertically, engage in inner member of the fastener, and press the inner member into an insertable member of the fastener, wherein upon pivoting the first arm and the second arm towards each other, the camming surface of the first arm and the camming surface of the second arm each can engage a top portion of an inner member of a fastener to be inserted into a hole in a workpiece, the camming surface of the first arm and the camming surface of the second arm lifting the inner member out of an insertable member of the fastener, the terminal projection of the first arm and the terminal projection of the second arm capturing a head portion of the insertable member within the indent of the first arm and the indent of the second arm, and wherein when an upward force is applied, the terminal projection of the first arm and the terminal projection of the second arm can lift the insertable member from the hole.

* * * * *